US009866737B2

(12) United States Patent
Uemura et al.

(10) Patent No.: US 9,866,737 B2
(45) Date of Patent: Jan. 9, 2018

(54) IMAGING APPARATUS WITH DRIVABLE OPTICAL SIGHTING UNIT

(71) Applicant: OLYMPUS CORPORATION, Hachioji-shi, Tokyo (JP)

(72) Inventors: Tatsuyuki Uemura, Hachioji (JP); Kunio Yamamiya, Sagamihara (JP); Junichi Ito, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 17 days.

(21) Appl. No.: 15/046,050

(22) Filed: Feb. 17, 2016

(65) Prior Publication Data

US 2016/0165111 A1 Jun. 9, 2016

Related U.S. Application Data

(63) Continuation of application No. PCT/JP2014/071749, filed on Aug. 20, 2014.

(30) Foreign Application Priority Data

Aug. 21, 2013 (JP) ................................. 2013-171386

(51) Int. Cl.
*H04N 5/225* (2006.01)
*H04N 5/232* (2006.01)
(Continued)

(52) U.S. Cl.
CPC ............. *H04N 5/2256* (2013.01); *G02B 7/08* (2013.01); *G02B 7/282* (2013.01); *G02B 27/646* (2013.01);
(Continued)

(58) Field of Classification Search
CPC ........ H04N 5/225; H04N 5/2256; G06K 9/52; G06K 9/4661
See application file for complete search history.

(56) References Cited

U.S. PATENT DOCUMENTS 5,005,032 A 4/1991 Burnham
5,598,238 A * 1/1997 Stephenson, III ..... G03B 13/04
396/178
(Continued)

FOREIGN PATENT DOCUMENTS

JP H0287129 A 3/1990
JP H04213437 A 8/1992
(Continued)

OTHER PUBLICATIONS

International Search Report mailed in corresponding International Patent Application No. PCT/JP2014/071749 dated Nov. 25, 2014, consisting of 5 pp. (English Translation Provided).
(Continued)

*Primary Examiner* — Abdelaaziz Tissire
(74) *Attorney, Agent, or Firm* — Volpe and Koenig, P.C.

(57) ABSTRACT

An imaging apparatus includes: an imaging optical system provided on a front side of the imaging apparatus facing a subject and configured to collect light from a field of view area; an image sensor configured to receive the light collected from the field of view area via the imaging optical system to generate image data; an optical sighting unit configured to transmit the light from the field of view area collected by the imaging optical system and to produce a virtual image of a light beam or a sighting mark in an area where the light from the field of view area transmits; and an imaging control unit configured to perform imaging under imaging control corresponding to driving of the optical sighting unit when the optical sighting unit is driven.

18 Claims, 30 Drawing Sheets

(51) Int. Cl.
*G02B 7/08* (2006.01)
*G03B 13/04* (2006.01)
*G03B 15/05* (2006.01)
*G03B 17/18* (2006.01)
*G03B 17/20* (2006.01)
*G02B 7/28* (2006.01)
*G02B 27/64* (2006.01)
*G06K 9/00* (2006.01)
*G06K 9/46* (2006.01)
*G06K 9/52* (2006.01)
*G06T 7/60* (2017.01)
*H04N 5/262* (2006.01)

(52) U.S. Cl.
CPC ............. *G03B 13/04* (2013.01); *G03B 15/05* (2013.01); *G03B 17/18* (2013.01); *G03B 17/20* (2013.01); *G06K 9/00268* (2013.01); *G06K 9/4661* (2013.01); *G06K 9/52* (2013.01); *G06T 7/60* (2013.01); *H04N 5/2251* (2013.01); *H04N 5/2254* (2013.01); *H04N 5/23209* (2013.01); *H04N 5/23212* (2013.01); *H04N 5/23287* (2013.01); *H04N 5/23293* (2013.01); *H04N 5/23296* (2013.01); *H04N 5/2621* (2013.01); *G03B 2205/0046* (2013.01); *G03B 2215/0507* (2013.01)

(56) References Cited

U.S. PATENT DOCUMENTS

| | | | |
|---|---|---|---|
| 5,778,261 A | 7/1998 | Tanaka | |
| 6,724,991 B1* | 4/2004 | Chase | G02B 23/14 348/341 |
| 2009/0051989 A1* | 2/2009 | Dobschal | F41G 1/30 359/15 |
| 2009/0193705 A1* | 8/2009 | LoRocco | F41G 1/30 42/123 |
| 2011/0299175 A1* | 12/2011 | Adachi | G02B 15/177 359/684 |
| 2012/0007987 A1* | 1/2012 | Gaber | H04N 5/332 348/164 |
| 2012/0044347 A1* | 2/2012 | Sugio | H04N 7/183 348/135 |
| 2012/0106170 A1* | 5/2012 | Matthews | F41G 1/30 362/311.06 |
| 2015/0215506 A1* | 7/2015 | Mochinushi | H04N 5/2254 348/374 |
| 2016/0223806 A1* | 8/2016 | Mochinushi | G02B 23/105 |

FOREIGN PATENT DOCUMENTS

| | | |
|---|---|---|
| JP | H05346607 A | 12/1993 |
| JP | H06202199 A | 7/1994 |
| JP | 2004246356 A | 9/2004 |
| JP | 2005173314 A | 6/2005 |
| JP | 2006072187 A | 3/2006 |
| JP | 2006155084 A | 6/2006 |
| JP | 2013102342 A | 5/2013 |
| JP | 2013162267 A | 8/2013 |

OTHER PUBLICATIONS

Written Opinion mailed in corresponding International Patent Application No. PCT/JP2014/071749 dated Nov. 25, 2014, consisting of 7 pp.

* cited by examiner

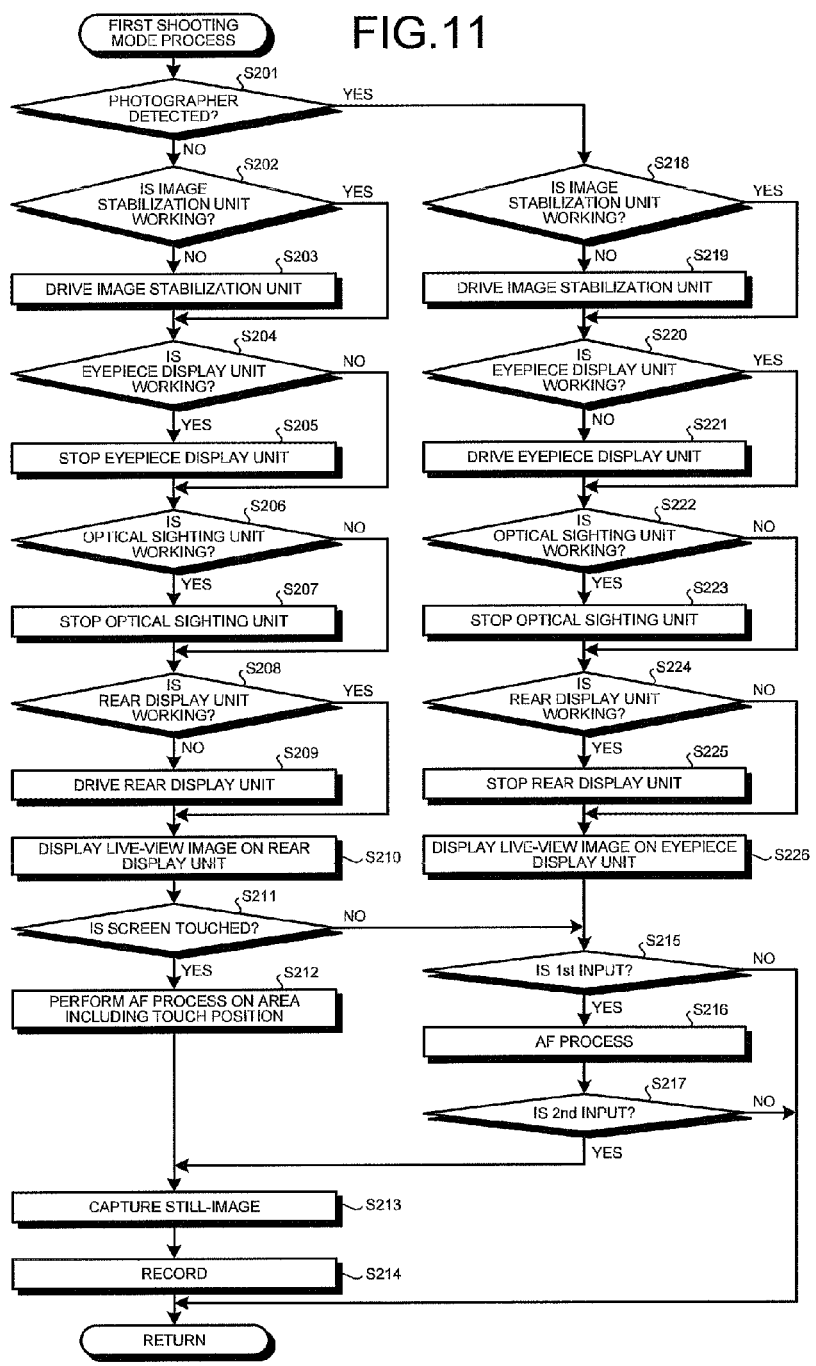

FIG.24

| ITEM | INITIAL SETTING CONDITIONS | SETTABLE CONDITIONS |
|---|---|---|
| FOCAL DISTANCE INFORMATION | Max VALUE (Tele) OF FOCAL DISTANCE | Max VALUE TO Min VALUE (Tele TO Wide) |
| AF OPERATING CONDITIONS | AF MODE: C-MODE | C-MODE, S-MODE, AF INHIBITED |
| | AF AREA: ENTIRE AREA | ENTIRE AREA, CENTER-WEIGHTED, SPOT, ARBITRARY POSITION |
| | AF ILLUMINATOR: EMISSION INHIBITED | EMISSION ALLOWED, EMISSION INHIBITED |
| SPECIAL EFFECTS | FISH-EYE: INHIBITED | INHIBITED, ALLOWED |
| | PINHOLE: INHIBITED | INHIBITED, ALLOWED |
| | FANTASTIC FOCUS: INHIBITED | INHIBITED, ALLOWED |
| | DIORAMA: INHIBITED | INHIBITED, ALLOWED |
| | TOY PHOTO: INHIBITED | INHIBITED, ALLOWED |
| | POP ART: ALLOWED | INHIBITED, ALLOWED |
| | ROUGH MONOCHROME: ALLOWED | INHIBITED, ALLOWED |
| | DRAMATIC TONE: ALLOWED | INHIBITED, ALLOWED |
| OPERATING CONDITIONS FOR IMAGE STABILIZATION | ELECTRONIC IMAGE STABILIZATION:<br>1: WHEN STILL-IMAGE SHOOTING MODE IS SELECTED<br>　·ALLOWED IN LIVE-VIEW MODE<br>2: WHEN VIDEO SHOOTING MODE IS SELECTED<br>　·ALLOWED | 1: STILL-IMAGE SHOOTING MODE<br>　·ALLOWED IN LIVE-VIEW MODE<br>　·ALLOWED DURING FIRST RELEASE ONLY<br>　·OPERATION INHIBITED<br>2: VIDEO SHOOTING MODE<br>　·ALLOWED<br>　·INHIBITED |
| | OPTICAL IMAGE STABILIZATION: DURING STILL-IMAGE SHOOTING | DURING STILL-IMAGE SHOOTING, OPERATION INHIBITED |

T10a, T10b, T10, T10c

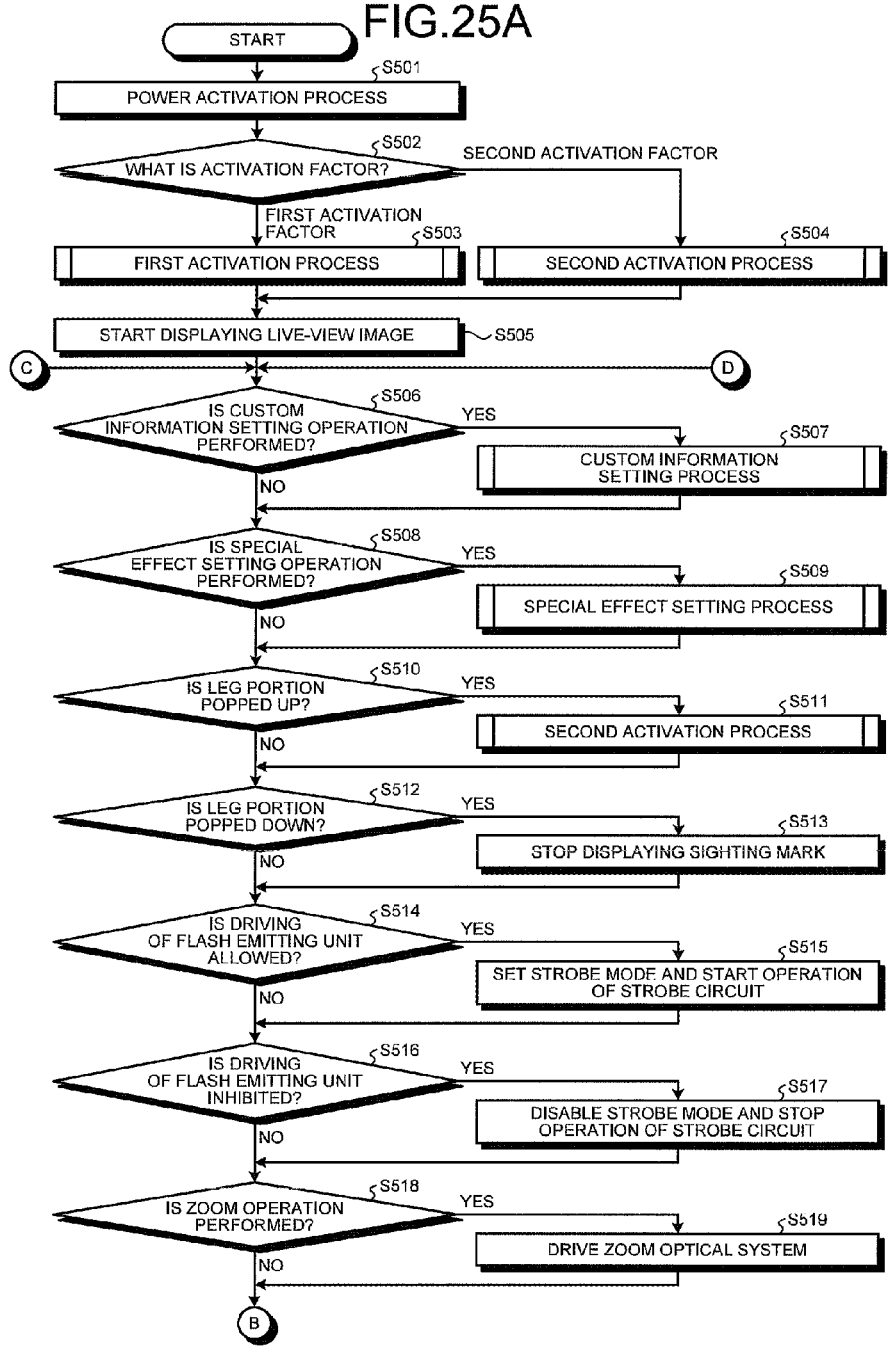

IMAGING APPARATUS WITH DRIVABLE OPTICAL SIGHTING UNIT

CROSS REFERENCES TO RELATED APPLICATIONS

This application is a continuation of PCT international application Ser. No. PCT/JP2014/071749 filed on Aug. 20, 2014 which designates the United States, incorporated herein by reference, and which claims the benefit of priority from Japanese Patent Application No. 2013-171386, filed on Aug. 21, 2013, incorporated herein by reference.

BACKGROUND

1. Technical Field

The disclosure relates to an imaging apparatus for imaging a subject to generate image data of the subject.

2. Related Art

Conventionally, in an imaging apparatus such as a digital camera, a technique of setting shooting parameters such as an exposure value or a shutter speed according to the type of an accessory such as an externally mounted flash unit attached to a hot shoe and controlling the imaging by the imaging apparatus is known (for example, see Japanese Laid-open Patent Publication No. 2005-173314).

Moreover, a technique of attaching an optical sighting device to an imaging apparatus so that the position of an approximate center of an imaging range of the imaging apparatus can be understood is known (for example, see Japanese Laid-open Patent Publication No. 2006-72187).

SUMMARY

In some embodiments, an imaging apparatus includes: an imaging optical system provided on a front side of the imaging apparatus facing a subject and configured to collect light from a field of view area; an image sensor configured to receive the light collected from the field of view area via the imaging optical system to generate image data; an optical sighting unit configured to transmit the light from the field of view area collected by the imaging optical system and to produce a virtual image of a light beam or a sighting mark in an area where the light from the field of view area transmits; and an imaging control unit configured to perform imaging under imaging control corresponding to driving of the optical sighting unit when the optical sighting unit is driven.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart illustrating an outline of a first shooting mode process in FIG. 10;

FIG. 24 is a diagram illustrating a portion of custom information recorded by a custom information recording unit illustrated in FIG. 23A;

FIG. 25A is a flowchart illustrating an outline of a process executed by the imaging apparatus according to the second embodiment of the present invention;

DETAILED DESCRIPTION

Hereinafter, modes for carrying out the present invention (hereinafter referred to as "embodiment(s)") will be described with reference to the drawings. The present invention is not limited to the following embodiments. The same reference signs are used to designate the same elements throughout the drawings. Note that the drawings are schematically depicted, and the relationship between the thickness and the width of each member, the ratio of each member, and the like are different from those of actual members. The dimensions or ratios of a member may different from one drawing to another drawing.

First Embodiment

[Configuration of Imaging Apparatus]

Figure 1A:
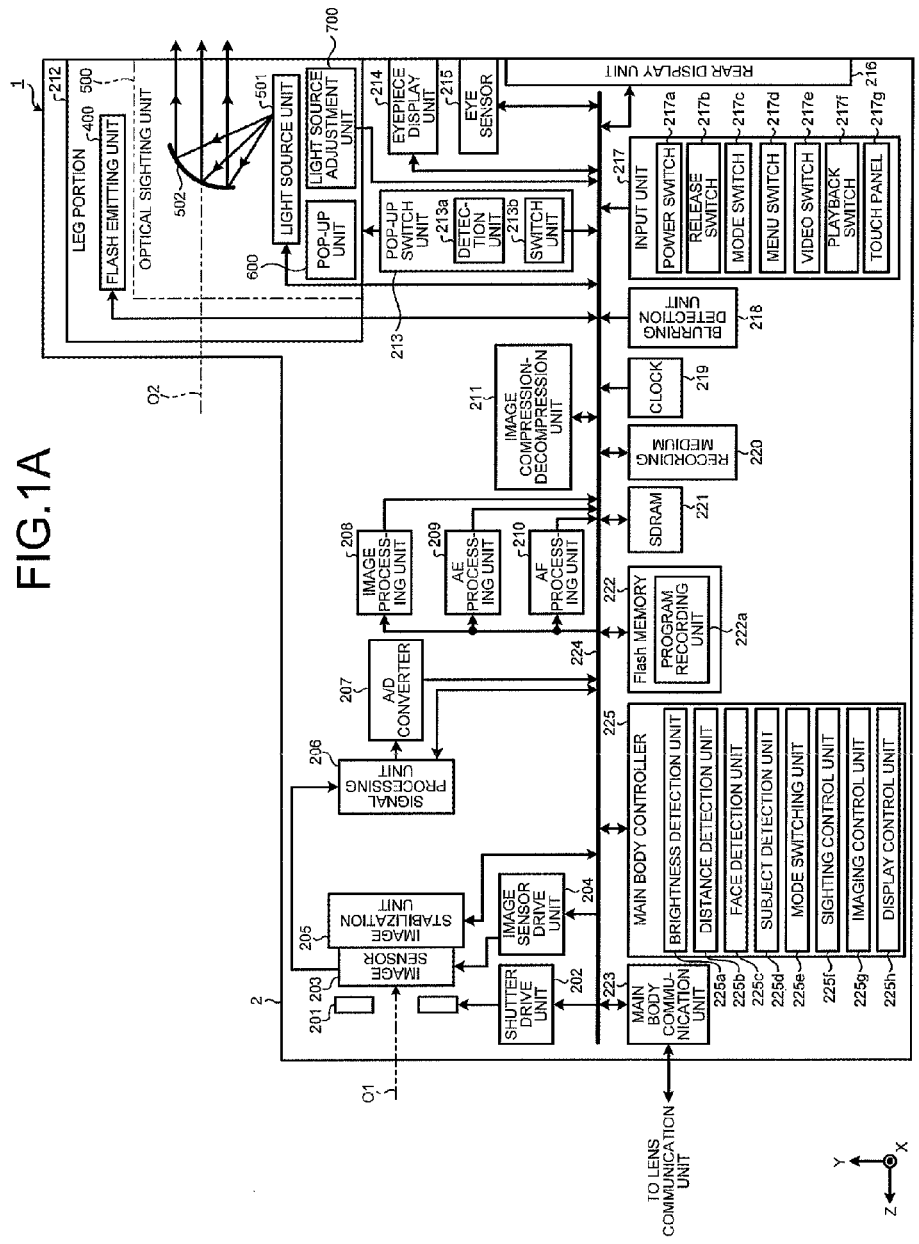
FIG. 1A is a block diagram illustrating a functional configuration of an imaging apparatus according to a first embodiment of the present invention.
Figure 1B:
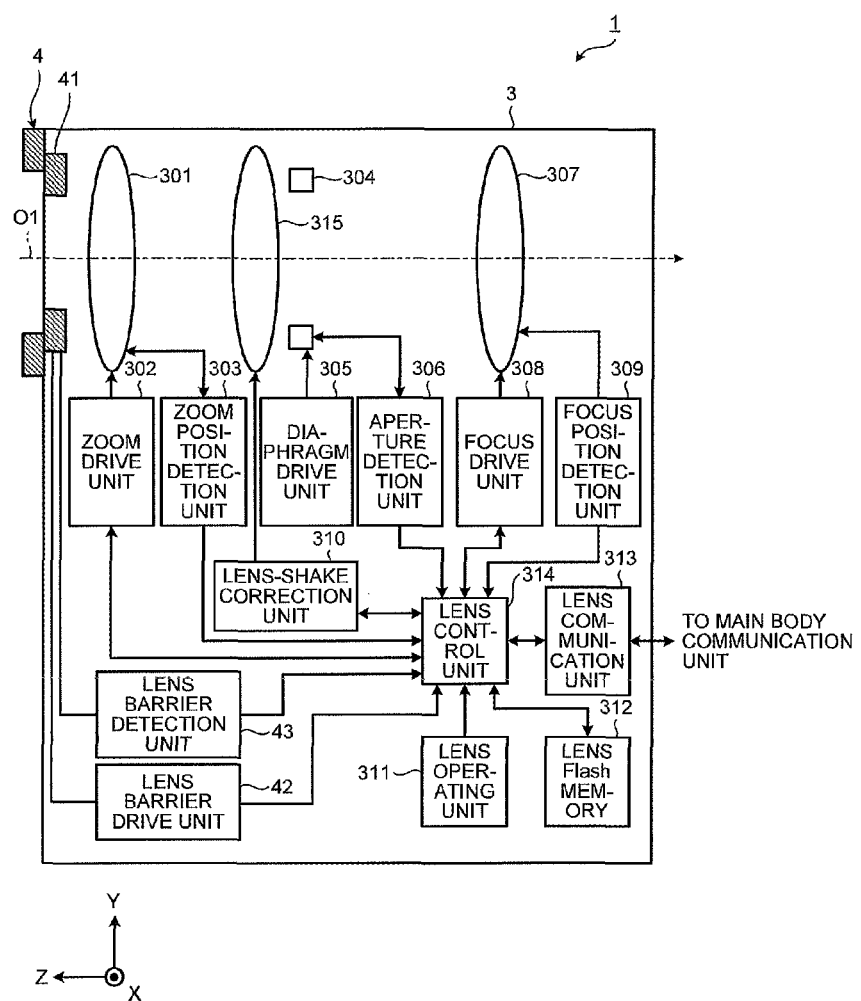
FIG. 1B is a block diagram illustrating a functional configuration of the imaging apparatus according to the first embodiment of the present invention.

FIGS. 1A and 1B are block diagrams schematically illustrating a functional configuration of an imaging apparatus according to a first embodiment of the present invention. An imaging apparatus 1 illustrated in FIGS. 1A and 1B includes a main body portion 2, a lens unit 3 that is detachably attached to the main body portion 2 and has an optical zooming function as well as a function of collecting light from a specified field of view area, and a lens barrier mechanism 4.

[Configuration of Main Body Portion]

First, the main body portion 2 will be described. The main body portion 2 includes a shutter 201, a shutter drive unit 202, an image sensor 203, an image sensor drive unit 204, an image stabilization unit 205, a signal processing unit 206, an A/D converter 207, an image processing unit 208, an AE processing unit 209, an AF processing unit 210, an image compression-decompression unit 211, a leg portion 212, a pop-up switch unit 213, an eyepiece display unit 214, an eye sensor 215, a rear display unit 216, an input unit 217, a blurring detection unit 218, a clock 219, a recording medium 220, a synchronous dynamic random access memory (SDRAM) 221, a flash memory 222, a main body communication unit 223, a bus 224, a main body controller 225, and a light source adjustment unit 700.

The shutter 201 sets the image sensor 203 to an exposed state or a shaded state. The shutter 201 is configured using a lens shutter or a focal-plane shutter.

The shutter drive unit 202 drives the shutter 201 according to a command signal input from the main body controller 225. The shutter drive unit 202 is configured using a step motor, a DC motor, or the like.

The image sensor 203 receives the light collected by the lens unit 3 and performs photoelectric conversion to generate electronic image data. Specifically, the image sensor 203 is configured using a charge coupled device (CCD) or a complementary metal oxide semiconductor (CMOS) that receives light collected by the lens unit 3 to convert the light into electrical signals. The image sensor 203 generates image data of a subject. The image sensor 203 is disposed on an optical axis O1 of the lens unit 3 so as to be orthogonal to the optical axis O1.

The image sensor drive unit 204 allows image data (analog signals) to be output from the image sensor 203 to the signal processing unit 206 at a specified time. Specifically, first, the image sensor drive unit 204 controls the start and end of exposure (photoelectric conversion) of each pixel of the image sensor 203 at a specified time. Moreover, the image sensor drive unit 204 allows image data (analog signals) to be output from the signal output photoelectrically converted in each pixel (charge amount output or voltage output) to the signal processing unit 206 after the end of the exposure (photoelectric conversion) of the image sensor 203. In this manner, the image sensor 203 controls the exposure of each pixel based on a control signal from the image sensor drive unit 204. The image sensor drive unit 204 functions as an electronic shutter.

Moreover, the image sensor drive unit 204 outputs the image data captured by the image sensor 203 by causing the image sensor 203 to repeatedly starting and ending the exposure at a specified frame rate (for example, 30 frames per second (fps) or 60 fps) under the control of the main body controller 225. Further, the image sensor drive unit 204 allows the image sensor 203 to output image data to the signal processing unit 206 at a high frame rate (for example, 120 fps) by thinning out the output of a specified pixel line (for example, the output of an even pixel line or an odd pixel line) which is the columns of pixels in a row direction among pixels disposed in the two dimension included in the image sensor 203 under the control of the main body controller 225.

The image stabilization unit 205 holds the image sensor 203 based on the detection result by the blurring detection unit 218 and moves the image sensor 203 to reduce the image blur due to an attitudinal change of the imaging apparatus 1. Specifically, the image stabilization unit 205 mechanically moves the image sensor 203 such that the image sensor 203 translates in the X-axis direction and the Y-axis direction and rotates about the Z-axis direction in order to correct the blurring of a photographer during photographing. For example, the image stabilization unit 205 corrects the blurring occurring in the imaging apparatus 1 by rotating or moving an XY plane orthogonal to the optical axis O1 of the lens unit 3, an XZ plane parallel to the optical axis O1 of the lens unit 3, and a YZ plane parallel to the optical axis O1 of the lens unit 3, of the image sensor 203.

Here, the blurring is an attitudinal change occurring in the imaging apparatus 1 when the photographer captures images using the imaging apparatus 1. It is known that since the imaging position of a subject imaged by the lens unit 3 moves due to the attitudinal change, an image blur occurs in the captured image data and the resolution decreases. The image stabilization unit 205 is configured using a holding frame having a heavy movable frame that holds the image sensor 203 and a plurality of actuators for translating and rotating the image sensor 203 (for example, any one of an electromagnetic voice coil motor, a piezoelectric device, and a polymer material).

The signal processing unit 206 performs a reset noise reduction process using a CDS circuit (not illustrated) on the image data input from the image sensor 203 and an analog signal process such as a waveform shaping process for grayscale correction and a gain-up process on a subject luminance signal under the control of the main body controller 225 and outputs the processed image data to the A/D converter 207.

The A/D converter 207 performs A/D conversion on the analog image data input from the signal processing unit 206 to generate digital image data (RAW data) and outputs the image data to the SDRAM 221 via the bus 224.

The image processing unit 208 acquires the image data (RAW data) from the SDRAM 221 via the bus 224, performs various image processes on the acquired image data, and outputs the processed image data to the SDRAM 221. Here, examples of the image process include an optical black reduction process of correcting an offset amount of a pixel output during shading, a white balance adjustment process of correcting a white image output of a subject image, a color matrix calculation process of converting the color space of image data, a gamma correction process, a color reproduction process, an edge enhancement process, a combination process of combining a plurality of items of image data, and a synchronization process of image data when the image sensor 203 has the Bayer arrangement.

The AE processing unit 209 acquires the image data recorded in the SDRAM 221 via the bus 224 and sets an exposure condition when the imaging apparatus 1 captures still images or video images based on the acquired image data. Specifically, the AE processing unit 209 calculates a luminance from the image data and determines an aperture, a shutter speed, an ISO sensitivity, and the like, for example, based on the calculated luminance to realize automatic exposure of the imaging apparatus 1.

The AF processing unit 210 acquires the image data recorded in the SDRAM 221 via the bus 224 and realizes focus adjustment of the imaging apparatus 1 based on the acquired image data. For example, the AF processing unit 210 extracts high-frequency signals from the image data, performs an auto-focus (AF) calculation process on the high-frequency signals to determine the focus evaluation of the imaging apparatus 1 to thereby automatically adjust the focus of the imaging apparatus 1. The AF processing unit 210 may automatically adjust the focus of the imaging apparatus 1 using a pupil division phase-difference method or specified pixel components (AF pixels) of the image sensor 203.

The image compression-decompression unit 211 acquires image data from the SDRAM 221 via the bus 224, compresses the acquired image data according to a specified format, and outputs the compressed image data to the recording medium 220 via a memory I/F (not illustrated). Here, the specified format may be a Joint photographic experts group (JPEG) format, a Motion JPEG format, an MP4 (H.264) format, or the like. Moreover, the image compression-decompression unit 211 acquires the image data (compressed image data) recorded in the recording medium 220 via the bus 224, decompresses (expands) the acquired image data, and outputs the decompressed image data to the SDRAM 221.

The leg portion 212 includes a flash emitting unit 400 that emits illumination light toward the field of view area of the imaging apparatus 1, an optical sighting unit 500 that emits a light beam or a sighting mark for setting sights on a desired subject in the field of view area of the imaging apparatus 1, a pop-up unit 600 for popping up the leg portion 212 from the main body portion 2, and the light source adjustment unit 700.

Figure 2:
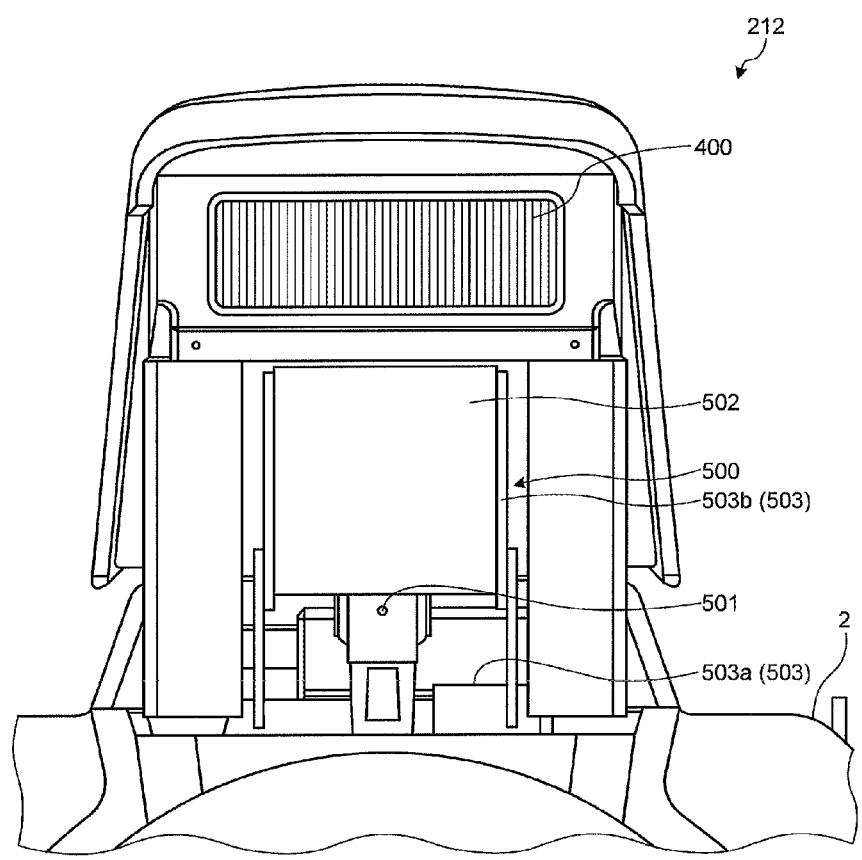
FIG. 2 is a front view illustrating a state in which a leg portion of the imaging apparatus according to the first embodiment of the present invention pops up from a main body portion.
Figure 3:
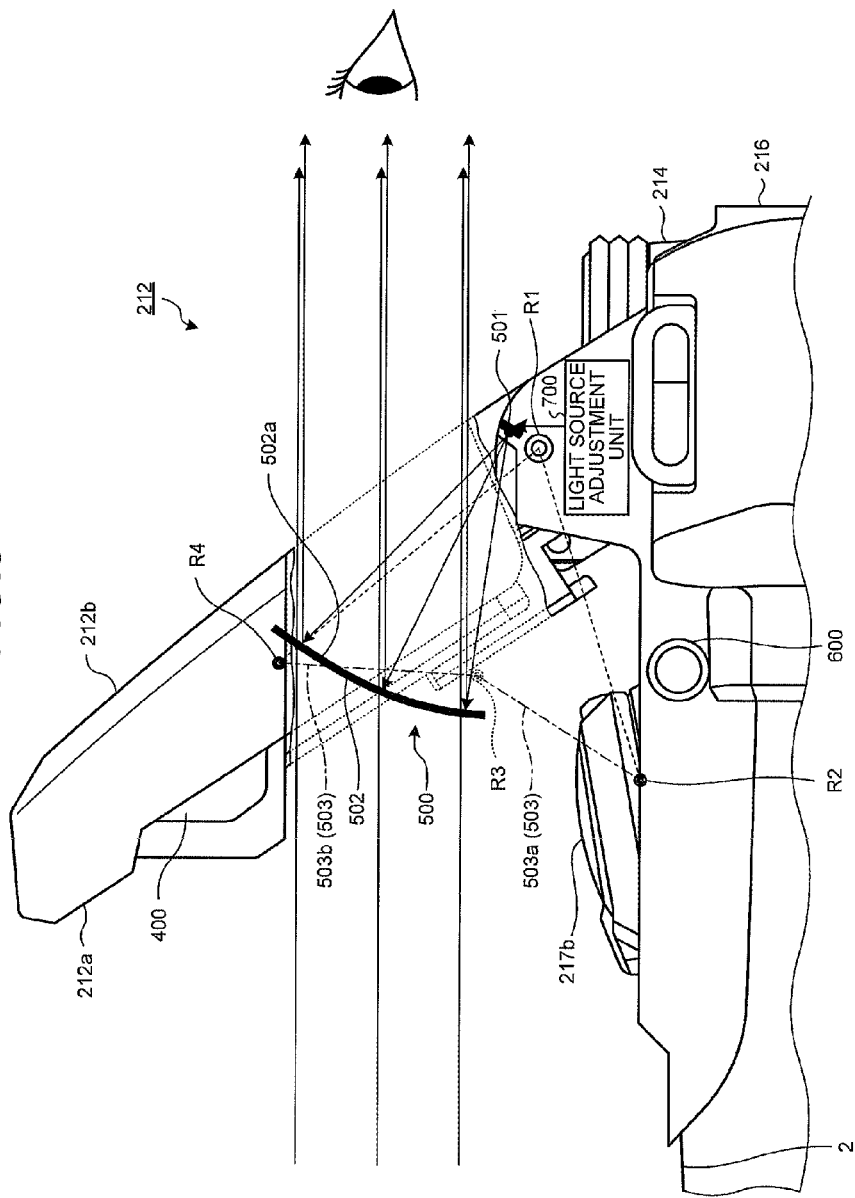
FIG. 3 is a partial cross-sectional view illustrating a state in which the leg portion of the imaging apparatus according to the first embodiment of the present invention pops up from the main body portion.
Figure 4:
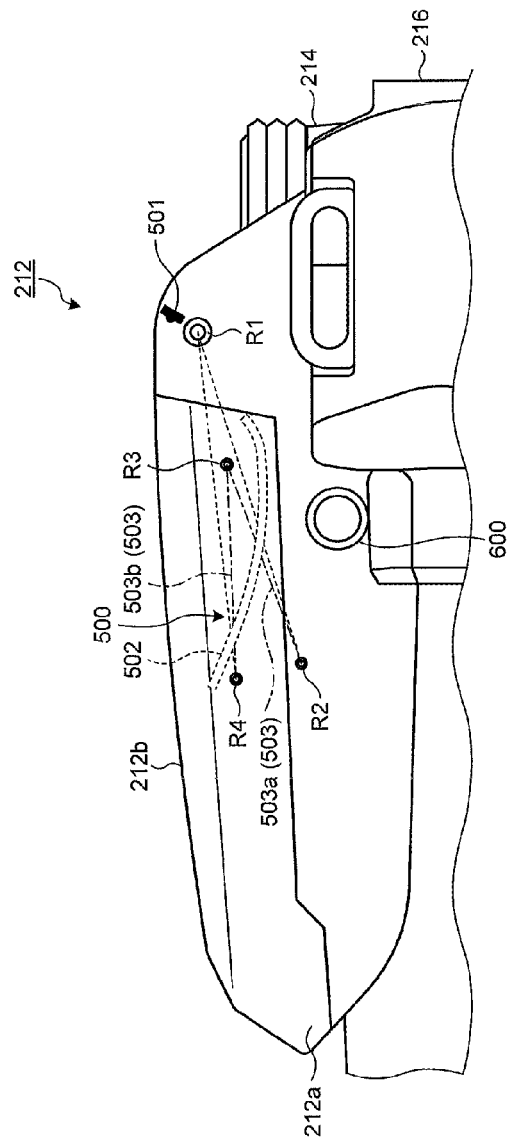
FIG. 4 is a side view illustrating a state in which the leg portion of the imaging apparatus according to the first embodiment of the present invention is accommodated in the main body portion.

Here, the configuration of the leg portion 212 will be described in detail. FIG. 2 is a front view illustrating a state in which the leg portion 212 pops up from the main body portion 2. FIG. 3 is a partial cross-sectional view illustrating a state in which the leg portion 212 pops up from the main body portion 2. FIG. 4 is a side view illustrating a state in which the leg portion 212 is accommodated in the main body portion 2.

As illustrated in FIGS. 2 to 4, the leg portion 212 is supported on the main body portion 2 so as to be rotatable with respect to the main body portion 2. Specifically, the leg portion 212 has a lower end (base end) which is connected to a first shaft R1 that passes in a left-right direction of the upper surface of the main body portion 2 on which a release switch 217*b* and the like of the main body portion 2 are arranged, whereby the leg portion 212 is supported on the main body portion 2 so as to be rotatable with respect to the main body portion 2.

The leg portion 212 has a tray shape and includes a lower portion 212*a* that holds the optical sighting unit 500, an upper portion 212*b* that is combined with the lower portion 212*a* so as to face an inner surface of the lower portion 212*a* to form approximately a housing together with the lower portion 212*a*, the flash emitting unit 400 that emits illumination light to the field of view area of the imaging apparatus 1, the optical sighting unit 500 that produces a virtual image of a light beam or a sighting mark within the field of view area or near the field of view area of the imaging apparatus 1, and the pop-up unit 600 that locks the leg portion 212 at the main body portion 2 and separates the leg portion 212 from the main body portion 2 in response to an external force.

The flash emitting unit 400 is provided at a distal end of the leg portion 212 so as to emit illumination light (flash) toward the field of view area of the imaging apparatus 1. The flash emitting unit 400 is disposed at a position separated from the main body portion 2 in a state (standing state) in which the leg portion 212 pops up from the main body portion 2. The flash emitting unit 400 emits the illumination light toward the field of view area of the imaging apparatus 1 under the control of the main body controller 225 in a state in which the leg portion 212 pops up from the main body portion 2. The flash emitting unit 400 is configured using an LED, an LED driver, and the like.

The optical sighting unit 500 produces the virtual image of a light beam or a sighting mark in the field of view area of the imaging apparatus 1, in which light passing through the optical sighting unit 500 is present, by emitting the light beam or the sighting mark toward the field of view area of the imaging apparatus 1 and reflecting the light beam or the sighting mark toward the rear side opposite to the front side of the imaging apparatus 1. The optical sighting unit 500 includes a light source unit 501 that emits the light beam or the sighting mark toward the field of view area of the imaging apparatus 1, an optical element 502 that transmits the light from the field of view area of the imaging apparatus 1 and reflects the light beam or the sighting mark emitted by the light source unit 501 toward the rear side of the imaging apparatus 1, a support portion 503 that supports the optical element 502 so as to be rotatable about the main body portion 2, and an opening 504 formed at a position crossing the line passing through the optical element 502 so that a cover member 504a that protects the optical element 502 can be opened and closed toward the subject side.

The light source unit 501 is configured using an LED that emits a red light beam or a red sighting mark, an LED driver, and the like, and emits the light beam or the sighting mark toward the optical element 502. The light source unit 501 is provided under the leg portion 212 so as to form a specified angle with respect to the optical element 502 and emits the light beam or the sighting mark toward an obliquely upper side of the subject. The light source unit 501 may be provided in the main body portion 2 so as to form a specified angle with respect to the optical element 502. Further, the light source unit 501 may be configured using an LED array in which a plurality of LEDs is arranged 2-dimensionally.

The optical element 502 is configured using a half mirror or a mirror having a dielectric multilayer film that reflects light of a specific wavelength (for example, red light) only. Moreover, the optical element 502 produces the virtual image of the light beam or the sighting mark emitted by the light source unit 501 in the field of view area of the imaging apparatus 1 in which light having passed through the optical element 502 is present by transmitting the light from the field of view area of the imaging apparatus 1 and reflecting the light fluxes emitted by the light source unit 501 toward the rear side. The optical element 502 has a curved parabolic surface or a spherical surface 502a approximate thereto, which is provided on the rear side when the leg portion 212 pops up from the main body portion 2.

The support portion 503 has a lower end connected to a second shaft R2 that passes in a left-right direction of the upper surface of the main body portion 2. The support portion 503 includes a pair of first link 503a that can rotate about the second shaft R2 as a rotation shaft and a pair of second links 503b that passes through a connecting portion at the lower end, is connected to the upper end of the first link 503a, and is rotatable about a third shaft R3 parallel to the second shaft R2 as a rotation shaft. The second link 503b passes in the left-right direction of the leg portion 212, is connected to the second and third shafts R2 and R3, and is rotatable about a fourth shaft R4 as a rotation shaft. The second link 503b supports the optical element 502 using both ends therein. The first link 503a supports the second link 503b using both ends therein.

The opening 504 has the cover member 504a that can be opened and closed toward the subject side and is provided at a position crossing the line that passes through the optical element 502. Specifically, the opening 504 is provided between the flash emitting unit 400 and the main body portion 2. The cover member 504a of the opening 504 opens when the leg portion 212 pops up. Further, the cover member 504a of the opening 504 protects the optical sighting unit 500 from an external force when the leg portion 212 is accommodated (in a pop-down state) in the main body portion 2

Figure 5:
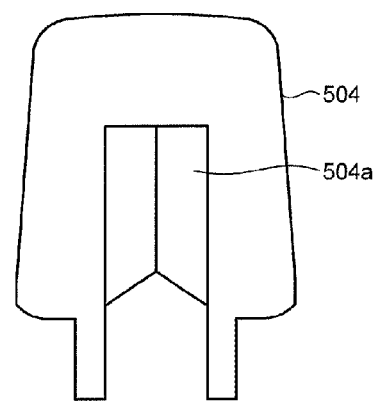
FIG. 5 is a top view schematically illustrating a state of a cover member when the leg portion of the imaging apparatus according to the first embodiment of the present invention is accommodated in the main body portion.
Figure 6:
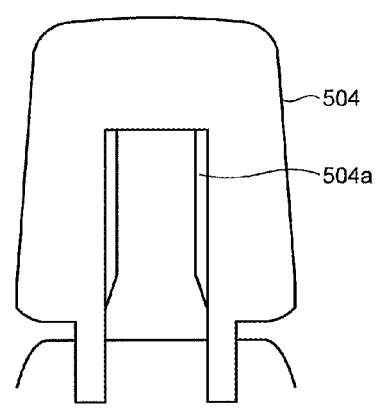
FIG. 6 is a top view schematically illustrating a state of the cover member when the leg portion of the imaging apparatus according to the first embodiment of the present invention pops up from the main body portion.

FIG. 5 is a top view schematically illustrating a state of the cover member 504a when the leg portion 212 is accommodated in the main body portion 2. FIG. 6 is a top view schematically illustrating a state of the cover member 504a when the leg portion 212 pops up from the main body portion 2.

As illustrated in FIGS. 5 and 6, the cover member 504a is provided so as to be opened and closed toward the subject side with respect to the opening 504 and is open toward the subject side when the leg portion 212 pops up from the main body portion 2. In this way, the photographer can see the field of view area of the imaging apparatus 1 with the aid of the opening 504 and the optical element 502 and can frame the subject by aligning the virtual image of the light beam or the sighting mark emitted by the optical sighting unit 500 on the subject with the aid of the optical element 502.

The pop-up unit 600 is configured using an electromagnetic magnet or the like and allows the leg portion 212 to pop up (be displaced) in a direction away from the main body portion 2 (that is, in the direction of being separated from the main body portion 2) under the control of the main body controller 225.

The light source adjustment unit 700 adjusts the position of the light beam or the sighting mark emitted by the light source unit 501 by adjusting the position of the light source unit 501 according to an operation of the photographer in order to eliminate the influence of parallax between the light beam or the sighting mark emitted by the optical sighting unit 500 and the optical axis O1 of the lens unit 3, which changes according to the distance between the imaging apparatus 1 and the subject. Moreover, the light source adjustment unit 700 is separated from an optical axis O2 of the lens unit 3 and is positioned on the upper side. Thus, the light source adjustment unit 700 can correct the parallax between the light beam or the sighting mark emitted by the optical sighting unit 500 and the optical axis O1 of the lens unit 3, which changes according to the distance between the imaging apparatus 1 and the subject by moving the light source unit 501 in an up-down direction with respect to the main body portion 2.

[Configuration of Light Source Adjustment Unit]

Figure 22:
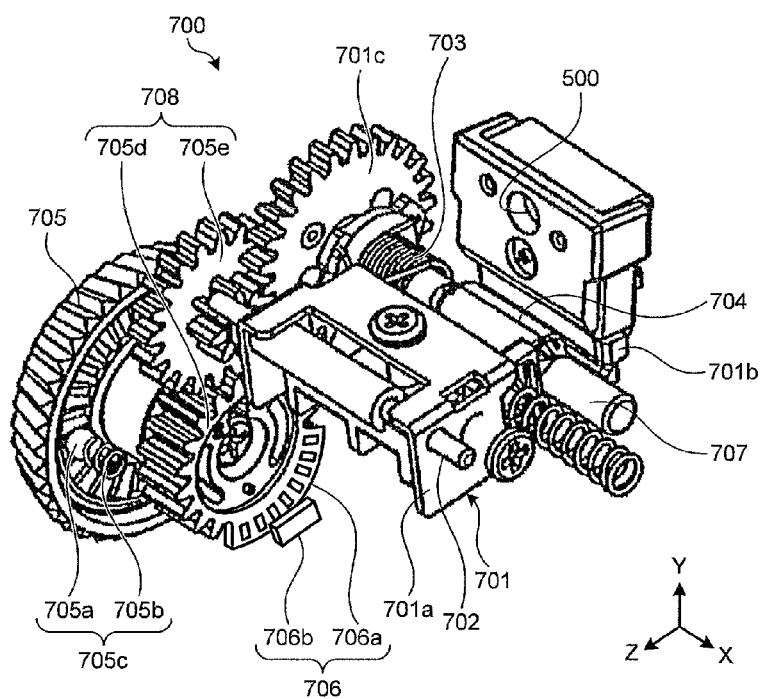
FIG. 22 is a perspective view illustrating a configuration of a light source adjustment unit including a light source unit in FIG. 1.

Here, a detailed configuration of the light source adjustment unit 700 will be described. FIG. 22 is a perspective view illustrating a configuration of the light source adjustment unit 700 including the light source unit 501.

As illustrated in FIG. 22, the light source adjustment unit 700 includes a light source holder 701, a support shaft 702, a compression coil spring 703, a cam 704, a knob 705 having a click portion 705c made up of a ball 705a and a pressing member 705b (for example, a compression coil spring), and a displacement amount detection unit 706 that detects the position of the light source unit 501.

The light source holder 701 is disposed so as to be rotatable about the support shaft 702 approximately parallel to the X-axis of a base end 701a. The light source holder 701 extends backward from the support shaft 702 and holds the light source unit 501 on a distal end 701b thereof. Moreover, a cam follower 701c is provided in the light source holder 701. The cam follower 701c is a portion that makes contact with the cam 704. Further, the light source holder 701 is biased by the compression coil spring 703 so as to approach the cam 704 so that the cam follower 701c is always in contact with the cam 704.

The cam 704 rotates about an axis approximately parallel to the X-axis and is formed so that the distance between a rotation shaft 707 and a cam surface that makes contact with the cam follower 701c changes with rotation of the cam 704. Moreover, with rotation of the cam 704, the light source holder 701 rotates about the support shaft 702. The cam 704 rotates with rotation of the knob 705.

The knob 705 is a dial-shaped rotating operating member that is disposed on an outer surface of the main body portion 2 (see FIG. 22) and is disposed at a position that the photographer can touch. The knob 705 is disposed on the left side of the light source unit 501 so as to be rotatable about an axis approximately parallel to the X-axis. Moreover, a rotating range of the knob 705 is restricted by the click portion 705c. In the first embodiment, rotation of the knob 705 is transmitted to the cam 704 via a reduction gear mechanism 708 made up of a plurality of spur gears (for example, two stages of first and second spur gears 705d and 705e). Further, the displacement amount detection unit 706 that detects the displacement amount of the light source unit 501 is provided in the knob 705. Specifically, a portion of the displacement amount detection unit 706 is provided on a side wall surface of the second spur gear 705e.

The displacement amount detection unit 706 is a bright-dark pattern (or an uneven surface) formed on the side wall surface of the second spur gear 705e, and reflecting members 706a arranged at an equal pitch interval, corresponding to a specified number of clicks of the rotation of the knob 705 are formed at a specified position or a pattern sheet is attached by an adhesive. Moreover, a position detection unit 706b is disposed in the displacement amount detection unit 706 at a specified position of the main body portion 2 facing the reflecting member 706a. The position detection unit 706b is configured using a photo-reflector in which a light-emitting device and a light-receiving device are formed integrally. That is, the displacement amount detection unit 706 detects the displacement amount in the up-down direction of the light source unit 501 with the aid of the reduction gear mechanism 708 and the cam 704 by detecting the movement of the reflecting member 706a with rotation of the second spur gear 705e from the original position (initial position) of the knob 705 and the position of the first spur gear 705d with the aid of the position detection unit 706b (the photo-reflector). When the displacement amount detection unit 706 is formed using an uneven surface of the first spur gear 705d which is configured using a magnetic member instead of the bright-dark pattern, the position may be magnetically detected using a position detector which has a hall element and a permanent magnet coupled to the main body portion 2 and faces the magnetic member. The displacement amount detection unit 706 functions as a position detection unit according to the first embodiment. In this case, when the position of the hall element is detected, a combination of the rotating position of the knob 705 and the original (initial) position detected by the photo-reflector can naturally be detected.

As described above, the light source adjustment unit 700 is configured such that, when the knob 705 is rotated, the light source holder 701 rotates about the support shaft 702 and the light source unit 501 moves in the up-down direction with respect to the main body portion 2. Further, the light source adjustment unit 700 detects the stopped position of the light source unit 501 with rotation of the knob 705 operated by the photographer with the aid of the displacement amount detection unit 706 and outputs the detection result to the main body controller 225.

Returning to FIG. 1A, the explanation of the configuration of the imaging apparatus 1 will be continued.

The pop-up switch unit 213 includes a detection unit 213a and a switch unit 213b.

The detection unit 213a detects whether the leg portion 212 pops up from the main body portion 2 and outputs the detection result to the main body controller 225. The detection unit 213a is configured using a contact sensor or the like.

The switch unit 213b receives a drive signal for driving the optical sighting unit 500 or a stop signal for stopping the optical sighting unit 500 and outputs the drive signal or the stop signal to the main body controller 225.

The eyepiece display unit 214 displays an image corresponding to the image data recorded in the SDRAM 221 via the bus 224 and displays information on the operation of the imaging apparatus 1 (for example, an aperture, a shutter speed, a focus area, and the like) so as to be superimposed on the image under the control of the main body controller 225. The eyepiece display unit 214 is configured using a display panel formed of a liquid crystal or organic electro luminescence (EL) material, a driver, and the like.

The eye sensor 215 detects an approach of an object (for example, the photographer) toward the eyepiece display unit 214 and outputs the detection result to the main body controller 225. The eye sensor 215 is configured using a contact sensor, an infrared sensor, or the like. In the present embodiment, the eye sensor 215 functions as an object detection unit.

The rear display unit 216 displays an image corresponding to the image data under the control of the main body controller 225. The rear display unit 216 is configured using a display panel formed of a liquid crystal or organic EL material or the like, a display driver, and the like. Here, the display of images includes a confirmation display (REC view display) for displaying image data for a specified period (for example, three seconds) immediately after imaging, a playback display for playing back the image data recorded in the recording medium 220, and a live-view display for sequentially displaying live-view images in time series that correspond to the image data generated continuously in time by the image sensor 203. Moreover, the rear display unit 216 appropriately displays operation information of the imaging apparatus 1 and information on the shooting.

The input unit 217 includes a power switch 217a that switches a power state of the imaging apparatus 1 to an ON state or an OFF state, the release switch 217b that receives a still-image release signal that gives a command for a still-image shooting, a mode switch 217c that switches various settings of the imaging apparatus 1, a menu switch 217d that displays various settings of the imaging apparatus 1 on the rear display unit 216, a video switch 217e that receives a video release signal that gives a command for a video shooting, a playback switch 217f that receives a command signal for playing back the image data recorded in the recording medium 220, and a touch panel 217g that is superimposed on a display screen of the rear display unit 216 so as to receive a position signal corresponding to a contact position from the outside. The release switch 217b can advance and retract in response to an external pressing force and receives a first release signal (hereinafter referred to as "1st") of a command signal for preparing operation for shooting when the switch is half-pressed and receives a second release signal (hereinafter referred to as "2nd") for instructing a still-image shooting operation when the switch is full-pressed.

The blurring detection unit 218 detects blurring of the image movement caused by an attitudinal change of the imaging apparatus 1. Specifically, the blurring detection unit 218 detects an amount of attitudinal change occurring in the imaging apparatus 1 by detecting an acceleration and an angular velocity resulting from the attitudinal change occurring in the imaging apparatus 1 and outputs the detection result to the main body controller 225.

Here, a horizontal direction of the imaging apparatus 1 in an attitude (for example, a normal attitude (so-called a lateral position)) of the imaging apparatus 1 is defined as an X-direction. A positive X-direction is defined as the rightward direction when the imaging apparatus 1 is seen from the subject side. Further, a vertical direction of the imaging apparatus 1 is defined as a Y-direction. Here, a positive Y-direction is defined as the upward direction in the normal attitude of the imaging apparatus 1. In such a coordinate system, the blurring detection unit 218 detects a rotational motion about the Z-axis (the optical axis O1 of the lens unit 3) as a roll, a rotational motion about the X-axis as a positive direction rotation of a pitch, a leftward rotation about the Z-axis when seen in the positive X-axis direction from the origin as a positive direction rotation of a roll, and a rightward rotation about the Y-axis when seen in a positive Y-axis direction from the origin as a positive direction rotation of a yaw. The image stabilization unit 205 and a lens-shake correction unit 310 of the lens unit 3 described later move the image sensor 203 and a correction lens 315 of the lens unit 3 described later in a direction orthogonal to the optical axis O1 based on the detection result (detection signal) obtained by the blurring detection unit 218 to control image stabilization. For example, the blurring detection unit 218 detects the acceleration components in the X, Y, and Z-axes resulting from the attitudinal change when the photographer captures images using the imaging apparatus 1 and the angular velocity components in the pitching, yawing, and rolling directions which are the rotation directions about the X, Y, and Z-axes as the amount of attitudinal change.

Moreover, the blurring detection unit 218 is configured using a three-axis acceleration sensor that detects acceleration components in the respective axis-directions and a gyro sensor that detects the angular velocity components in the pitching, yawing, and rolling directions which are the rotation directions. Further, the blurring detection unit 218 detects repositioning of the imaging apparatus 1 by the photographer. Specifically, the blurring detection unit 218 detects whether there is a unique amount of attitudinal change when the photographer repositions the imaging apparatus 1 due to the fact that the detection output of the acceleration components in the X, Y, and Z-axes and the angular velocity components in the pitching, yawing, and rolling directions which are the rotation directions about the X, Y, and Z-axes are changed. For example, the repositioning causes a larger attitudinal change in the imaging apparatus 1 than an attitudinal change resulting from normal blurring. Thus, the acceleration and angular velocity components detected by the blurring detection unit 218 are larger than the acceleration and angular velocity components which possibly occur in normal image stabilization. In this example, the presence of repositioning is detected by estimating that the photographer has repositioned the imaging apparatus 1 when larger acceleration and angular velocity components than specified acceleration and angular velocity component thresholds are detected.

Further, depending on the detection output of the blurring detection unit 218, it is determined that repositioning of the imaging apparatus 1 by the photographer is present. Then, when the eye sensor 215 detects an object (the photographer), this event is detected as the repositioning of the imaging apparatus 1 by the photographer. Here, the repositioning is an operation of the photographer confirming the composition of the subject on the eyepiece display unit 214 after determining the composition of the subject on the optical sighting unit 500 or the rear display unit 216. Naturally, the output result output from an imaging apparatus that has a rotating liquid crystal display which can monitor the photographer side (for example, which uses a biaxial hinge or the like) and an eyepiece display unit, an imaging apparatus provided with a sensor (a combination of a hall element and a magnet) that detects a screen reversal may be used.

Moreover, the blurring detection unit 218 detects the repositioning of the imaging apparatus 1 by the photographer. Specifically, when the eye sensor 215 detects an object (the photographer), the blurring detection unit 218 detects this event as the repositioning of the imaging apparatus 1 by the photographer. Here, the repositioning is an operation of the photographer confirming the composition of a subject on the eyepiece display unit 214 after determining the composition of the subject on the optical sighting unit 500 or the rear display unit 216. Naturally, an imaging apparatus, a sensor, or the like that monitors the photographer side may be provided, and the output result output from the imaging apparatus or the sensor may be used.

The clock 219 has a time measuring function and a function of determining the shooting date and time. The clock 219 outputs date data to the main body controller 225 in order to add the date data to the image data captured by the image sensor 203.

The recording medium 220 is configured using a memory card or the like mounted from the outside of the imaging apparatus 1. The recording medium 220 is detachably attached to the imaging apparatus 1 via a memory I/F (not illustrated). The RAW data and the image data processed by the image processing unit 208 or the image compression-decompression unit 211 are written to the recording medium 220. Moreover, the image data recorded by the main body controller 225 is read from the recording medium 220.

The SDRAM 221 temporarily records the image data input from the A/D converter 207 via the bus 224, the image data input from the image processing unit 208, and the information being processed by the imaging apparatus 1. For example, the SDRAM 221 temporarily records the image data that the image sensor 203 sequentially outputs for each frame via the signal processing unit 206, the A/D converter 207, and the bus 224.

The flash memory 222 has a program recording unit 222a. The program recording unit 222a records various programs for operating the imaging apparatus 1, various items of data used during execution of the program, various image processing parameters necessary for the image processing operation of the image processing unit 208, and the like.

The main body communication unit 223 is a communication interface for performing communication with the lens unit 3 attached to the main body portion 2. The main body communication unit 223 includes electrical contacts with the lens unit 3.

The bus 224 is configured using transmission paths or the like that connect each element of the imaging apparatus 1.

The bus 224 transmits various data generated in the imaging apparatus 1 to each element of the imaging apparatus 1.

The main body controller 225 transmits commands and data to each element of the imaging apparatus 1 according to a command signal from the input unit 217 to overall control the operation of the imaging apparatus 1. The main body controller 225 is configured using a central processing unit (CPU) or the like.

Here, a detailed configuration of the main body controller 225 will be described. The main body controller 225 includes a brightness detection unit 225a, a distance detection unit 225b, a face detection unit 225c, a subject detection unit 225d, a mode switching unit 225e, a sighting control unit 225f, an imaging control unit 225g, and a display control unit 225h.

The brightness detection unit 225a detects the brightness of the field of view area of the imaging apparatus 1 based on the imaging apparatus generated by the image sensor 203. Specifically, the brightness detection unit 225a detects the brightness of the field of view area of the imaging apparatus 1 or the brightness of the focus area of the lens unit 3 based on a luminance component included in the image data generated by the image sensor 203.

The distance detection unit 225b detects the distance from the imaging apparatus 1 to the subject based on the image data generated by the image sensor 203.

The face detection unit 225c detects the face of the subject in an image corresponding to the image data generated by the image sensor 203. Specifically, the face detection unit 225c detects the face of the subject using a known technique such as pattern matching in the image corresponding to the image data generated by the image sensor 203. The face detection unit 225c may detect the face of an animal such as a dog or a cat other than a person.

The subject detection unit 225d detects a subject in an image corresponding to the image data generated by the image sensor 203. Specifically, the subject detection unit 225d detects the same subject between the images successively generated by the image sensor 203. For example, the subject detection unit 225d detects the feature points of a subject by pattern matching or the like and detects an area (outline) that includes the feature points as a main subject. Here, the feature point is a luminance, a contrast, and a color histogram. The subject detection unit 225d may detect a subject in a detection area within an image based on the focus area of the lens unit 3. Further, the subject detection unit 225d may detect the subject based on the brightness of the field of view area detected by the brightness detection unit 225a or the distance to the subject detected by the distance detection unit 225b. Furthermore, the subject detection unit 225d may detect a person (including a baby) or an animal (for example, a bird, a cat, or a dog) as the subject using a known technique such as pattern matching. The subject detection unit 225d may track a subject between temporally adjacent images.

The mode switching unit 225e switches a shooting mode of the imaging apparatus 1 from a first shooting mode for shooting under the control based on the image data generated by the image sensor 203 to a second shooting mode for shooting under the control corresponding to the driving of the optical sighting unit 500 when the optical sighting unit 500 is driven. Specifically, the mode switching unit 225e switches the shooting mode to the second shooting mode of holding the driving of the image stabilization unit 205. Further, the mode switching unit 225e switches the shooting mode of the imaging apparatus 1 to a third shooting mode when the blurring detection unit 218 has detected an acceleration of a specified threshold or higher.

The sighting control unit 225f controls the driving of the optical sighting unit 500. For example, when the detection unit 213a has detected that the leg portion 212 is popped up, the sighting control unit 225f allows the light beam or the sighting mark to be emitted from the light source unit 501. Further, the sighting control unit 225f allows the light beam or the sighting mark to be emitted from the light source unit 501 when a drive signal of driving the optical sighting unit 500 is input from the switch unit 213b and stops the emission of the light beam or the sighting mark from the light source unit 501 when a stop signal of stopping the optical sighting unit 500 is input from the switch unit 213b.

The imaging control unit 225g performs control of starting a still-image shooting operation by the imaging apparatus 1 when 2nd is input from the release switch 217b. Here, the shooting operation by the imaging apparatus 1 means an operation in which the signal processing unit 206, the A/D converter 207, and image processing unit 208 apply a specified process on the image data output by the image sensor 203 according to driving of the shutter drive unit 202 and the image sensor drive unit 204. The image data processed in this manner is compressed according to a specified format by the image compression-decompression unit 211 and recorded in the recording medium 220 via the bus 224 under the control of the imaging control unit 225g.

Moreover, the imaging control unit 225g performs control of starting a video shooting operation by the imaging apparatus 1 when a video shooting release signal is input from the video switch 217e. Further, the imaging control unit 225g controls the driving of the image stabilization unit 205 and/or the AF process of the lens unit 3. Specifically, the imaging control unit 225g performs shooting under the control corresponding to the driving of the optical sighting unit 500 when the optical sighting unit 500 is driven. Specifically, when the shooting mode of the imaging apparatus 1 is switched from the first shooting mode to the second shooting mode by the mode switching unit 225e, the imaging control unit 225g holds the driving of the image stabilization unit 205 and/or executes an AF process for setting a point of focus of the imaging apparatus 1 to the center in the image corresponding to the image data generated by the image sensor 203.

The display control unit 225h controls a display mode of the eyepiece display unit 214 or the rear display unit 216. Specifically, the display control unit 225h displays a live-view image corresponding to the image data generated by the image sensor 203 on the eyepiece display unit 214 when the eye sensor 215 has detected the photographer and displays a live-view image corresponding to the image data generated by the image sensor 203 on the rear display unit 216 when the eye sensor 215 has not detected the photographer.

The main body portion 2 having the above-described configuration may further include a voice input/output function, a flash function, and a communication function of bidirectionally communicating with external devices.

[Configuration of Lens Unit]

Next, the lens unit 3 will be described. As illustrated in FIG. 1B, the lens unit 3 includes a zoom optical system 301, a zoom drive unit 302, a zoom position detection unit 303, a diaphragm 304, a diaphragm drive unit 305, an aperture detection unit 306, a focus optical system 307, a focus drive unit 308, a focus position detection unit 309, a lens-shake correction unit 310, a lens operating unit 311, a lens flash memory 312, a lens communication unit 313, and a lens control unit 314. In the present embodiment, the lens unit 3 functions as an imaging optical system.

The zoom optical system 301 is configured using one or a plurality of lenses and moves along the optical axis O1 of the lens unit 3 to change a zoom ratio (angle of view) of the optical zoom of the lens unit 3. For example, the zoom optical system 301 can change the focal distance between 12 mm and 600 mm.

The zoom drive unit 302 changes the optical zoom of the imaging apparatus 1 by moving the zoom optical system 301 along the optical axis O1 under the control of the lens control unit 314. The zoom drive unit 302 is configured using a DC motor, a step motor, a voice coil motor (VCM) such as a movable coil-type or movable magnet-type linear motor, and the like.

The zoom position detection unit 303 detects the position of the zoom optical system 301 on the optical axis O1 and outputs the detection result to the lens control unit 314. The zoom position detection unit 303 is configured using a photo-interrupter or the like. In the first embodiment, the zoom position detection unit 303 functions as a focal distance detection unit.

The diaphragm 304 adjusts the exposure by limiting the amount of incident light collected by the zoom optical system 301.

The diaphragm drive unit 305 changes the aperture of the imaging apparatus 1 by driving the diaphragm 304 under the control of the lens control unit 314. The diaphragm drive unit 305 is configured using a step motor or the like.

The aperture detection unit 306 detects the aperture from the present state of the diaphragm 304 and outputs the detection result to the lens control unit 314. The aperture detection unit 306 is configured using a photo-interrupter, a step motor, or the like.

The focus optical system 307 is configured using one or a plurality of lenses and changes the point of focus of the lens unit 3 by moving along the optical axis O1 of the lens unit 3.

The focus drive unit 308 adjusts the point of focus of the lens unit 3 by moving the focus optical system 307 along the optical axis O1 under the control of the lens control unit 314. The focus drive unit 308 is configured using a DC motor, a step motor, or a voice coil motor such as a movable coil-type or movable magnet-type linear motor, or the like.

The focus position detection unit 309 detects the position of the focus optical system 307 on the optical axis O1 and outputs the detection result to the lens control unit 314. The focus position detection unit 309 is configured using a photo-interrupter or the like.

The lens-shake correction unit 310 mechanically moves the correction lens 315 in the X-axis direction and the Y-axis direction with respect to the optical axis O1 in order to correct the blurring of the photographer during the shooting. Specifically, the lens-shake correction unit 310 rotates or moves the holding frame (not illustrated) that holds the correction lens 315 along the XY plane orthogonal to the optical axis O1 of the lens unit 3, the XZ plane parallel to the optical axis O1 of the lens unit 3, and the YZ plane parallel to the optical axis O1 of the lens unit 3. The lens-shake correction unit 310 is configured using a plurality of actuators (for example, a voice coil motor such as a movable coil-type or movable magnet-type linear motor, a piezoelectric device, and a polymer actuator). The lens-shake correction unit 310 moves the correction lens 315 based on the detection result of the blurring detection unit 218 of the main body portion 2.

The lens operating unit 311 is an operating ring provided around the lens barrel of the lens unit 3 and receives a command signal to change the optical zoom of the lens unit 3 or a command signal to adjust the point of focus of the lens unit 3. The lens operating unit 311 may be a push-type switch or a lever-type switch.

The lens flash memory 312 records a control program for determining the position and the movement of the zoom optical system 301, the diaphragm 304, and the focus optical system 307, the lens characteristics of the lens unit 3, and various parameters. Here, the lens characteristics include chromatic aberration, brightness information (f-value), and focal distance information (for example, 12 mm to 600 mm) of the lens unit 3.

The lens communication unit 313 is a communication interface for communicating with the main body communication unit 223 of the main body portion 2 when the lens unit 3 is attached to the main body portion 2. The lens communication unit 313 includes electrical contacts with the main body portion 2.

The lens control unit 314 is configured using a CPU or the like and controls the operation of the lens unit 3 according to a command signal from the lens operating unit 311 or a command signal from the main body portion 2. Specifically, the lens control unit 314 drives the focus drive unit 308 to adjust the focusing of the focus optical system 307 or drives the zoom drive unit 302 to change the zoom ratio of the optical zoom of the zoom optical system 301 according to the command signal from the lens operating unit 311. Moreover, the lens control unit 314 periodically transmits the lens characteristics of the lens unit 3 and the identification information for identifying the lens unit 3 to the main body portion 2 when the lens unit 3 is attached to the main body portion 2. Further, the lens control unit 314 transmits the lens information to the main body portion 2 in synchronization with the frame of the image data generated by the image sensor 203.

[Configuration of Lens Barrier Mechanism]

Next, the configuration of the lens barrier mechanism 4 will be described.

The lens barrier mechanism 4 includes a lens barrier 41 disposed on the subject side of the zoom optical system 301 of the lens unit 3 so as to prevent condensation or adhering of dust to the surface of the zoom optical system 301, a lens barrier drive unit 42 that opens and closes the lens barrier 41 in response to activation of the imaging apparatus 1, and a lens barrier detection unit 43 that detects the opening or closing of the lens barrier 41. The detailed configuration of the lens barrier mechanism 4 is disclosed, for example, in Japanese Laid-open Patent Publication No. 2009-169178 filed by the same applicant as the present invention.

Figure 7:
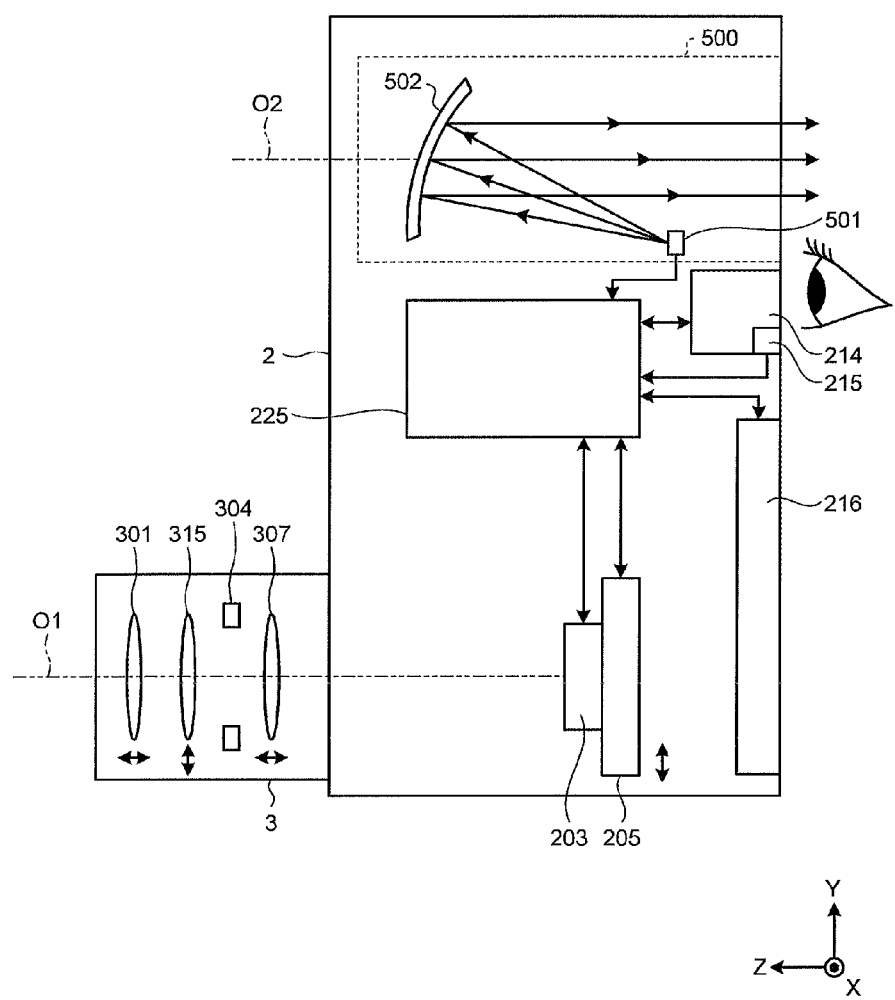
FIG. 7 is a diagram schematically illustrating a situation when shooting is performed while checking the framing of a subject using an eyepiece display unit of the imaging apparatus according to the first embodiment of the present invention.

In the imaging apparatus 1 having the above-described configuration, any one of the eyepiece display unit 214, the rear display unit 216, and the optical sighting unit 500 is used according to the purpose of shooting by the photographer. Specifically, when the photographer wants to capture a desired image with a sense of immersion, the photographer performs shooting while checking a live-view image displayed on the eyepiece display unit 214 as illustrated in FIG. 7 in order to obtain satisfactory color reproduction of the subject without being influenced by external light.

Figure 8:
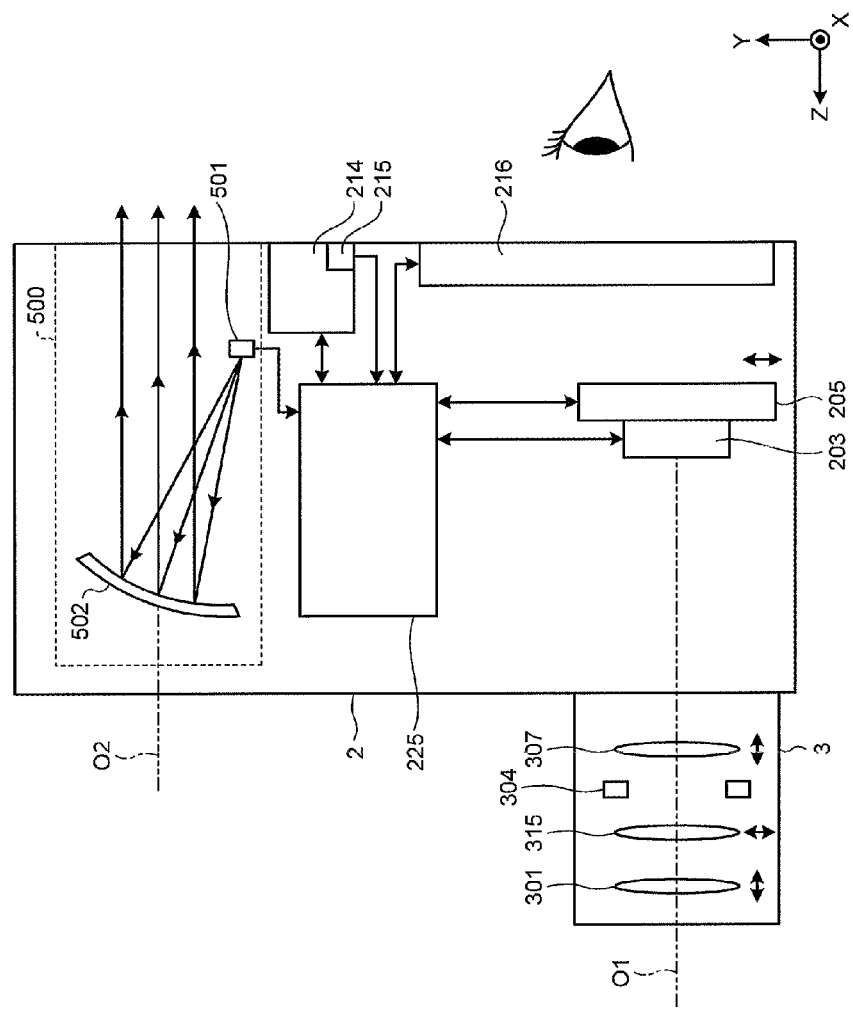
FIG. 8 is a diagram schematically illustrating a situation when shooting is performed while checking the framing of a subject using a rear display unit of the imaging apparatus according to the first embodiment of the present invention.

Moreover, when the photographer wants to capture an image while checking a subject on a large screen, the photographer performs shooting by aligning the point of focus of the imaging apparatus 1 at a desired position with an immediate operation such as a touch and release operation while checking a live-view image displayed on the rear display unit 216 as illustrated in FIG. 8.

Figure 9:
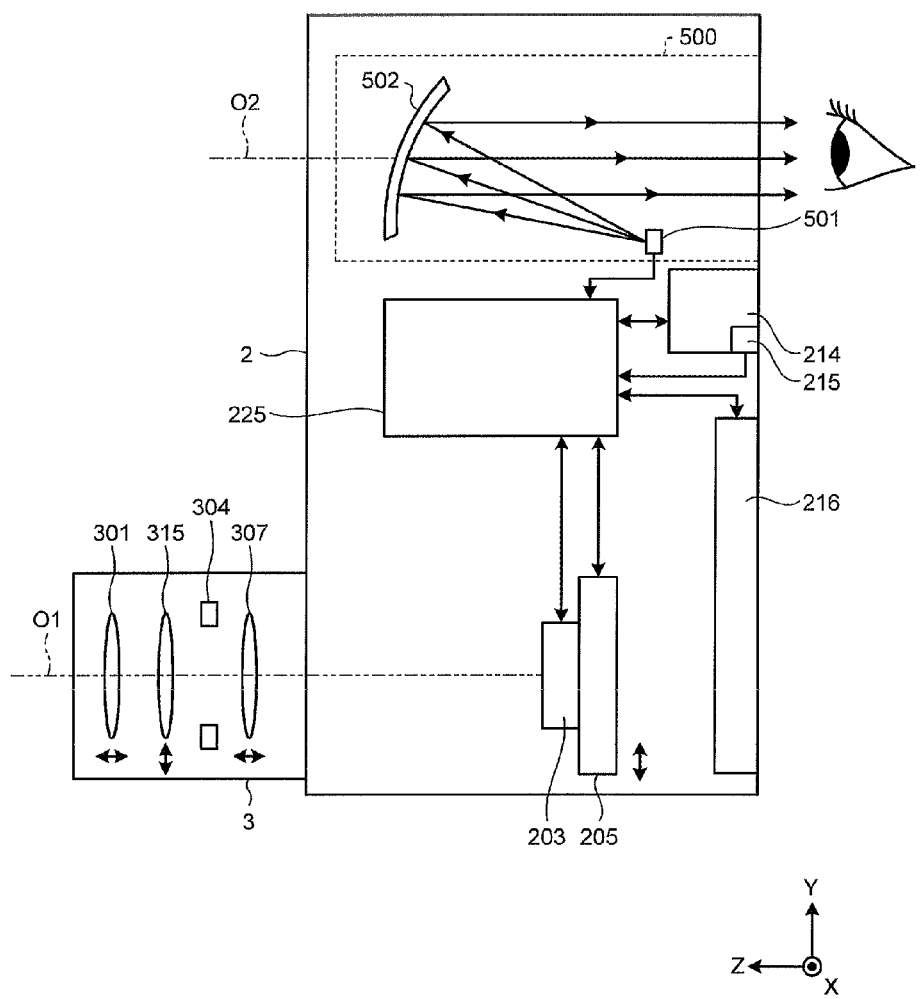
FIG. 9 is a diagram schematically illustrating a situation when shooting is performed while checking the framing of a subject using an optical sighting unit of the imaging apparatus according to the first embodiment of the present invention.

Further, when the photographer wants to capture an image while setting sights on a subject in a telephoto position or the field of view area of the imaging apparatus 1, the photographer performs shooting by aligning the light beam or the sighting mark emitted by the optical sighting unit 500 at a desired subject as illustrated in FIG. 9.

Figure 10:
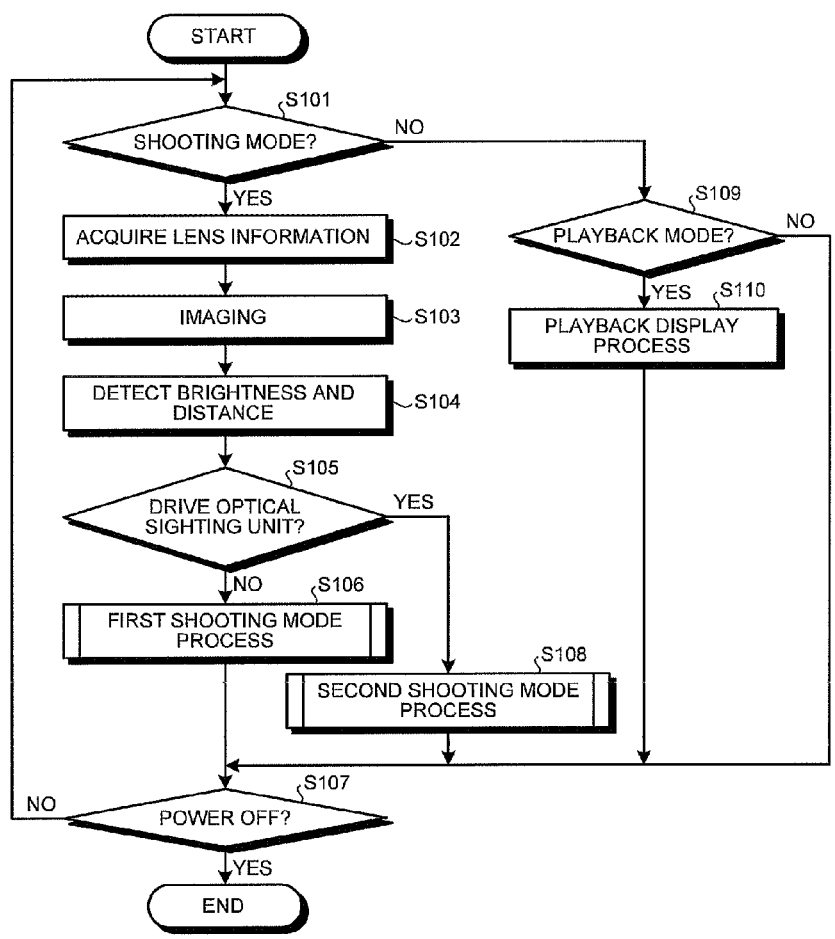
FIG. 10 is a flowchart illustrating an outline of a process executed by the imaging apparatus according to the first embodiment of the present invention.

Next, the process executed by the imaging apparatus 1 will be described. FIG. 10 is a flowchart illustrating an outline of the process executed by the imaging apparatus 1.

As illustrated in FIG. 10, when the imaging apparatus 1 is in a shooting mode (step S101: Yes), the main body controller 225 acquires the lens information of the lens unit 3 via the bus 224 (step S102). Specifically, the main body controller 225 acquires the current focal distance of the zoom optical system 301 of the lens unit 3 and the point of focus of the focus optical system 307 via the bus 224. In this case, the main body controller 225 may acquire the aperture of the diaphragm 304.

Subsequently, the imaging control unit 225g causes the image sensor 203 to execute imaging by driving the image sensor drive unit 204 (step S103).

After that, the imaging apparatus 1 detects the brightness of the field of view area of the imaging apparatus 1 and the distance from the imaging apparatus 1 to the subject based on an image corresponding to the image data generated by the image sensor 203 (step S104). Specifically, the brightness detection unit 225a detects the brightness of the field of view area based on the image corresponding to the image data generated by the image sensor 203. Moreover, the distance detection unit 225b detects the distance to the subject based on the image corresponding to the image data generated by the image sensor 203.

Subsequently, the main body controller 225 determines whether or not to drive the optical sighting unit 500 (step S105). Specifically, the main body controller 225 determines whether or not to drive the optical sighting unit 500 based on the distance from the imaging apparatus 1 to the subject detected by the distance detection unit 225b or on the input of the command signal to pop up the leg portion 212, input from the input unit 217. When the main body controller 225 determines that the optical sighting unit 500 is to be driven (step S105: Yes), the imaging apparatus 1 proceeds to step S108 described later. In contrast, when the main body controller 225 determines that the optical sighting unit 500 is not to be driven (step S105: No), the imaging apparatus 1 proceeds to step S106 described later.

In step S106, the imaging apparatus 1 executes a first shooting mode process for shooting under the control based on the image data generated by the image sensor 203. The details of the first shooting mode process will be described later. Subsequently to step S106, the imaging apparatus 1 proceeds to step S107.

Subsequently, when the power switch 217a is operated and the power of the imaging apparatus 1 is turned off (step S107: Yes), the imaging apparatus 1 ends this process. In contrast, when the power switch 217a is not operated and the power of the imaging apparatus 1 is not turned off (step S107: No), the imaging apparatus 1 returns to step S101.

In step S108, the imaging apparatus 1 executes a second shooting mode process for shooting under the control corresponding to the driving of the optical sighting unit 500. The details of the second shooting mode process will be described later. Subsequently to step S108, the imaging apparatus 1 proceeds to step S107.

When the imaging apparatus 1 is not set to the shooting mode in step S101 (step S101: NO), and the imaging apparatus 1 is set to a playback mode (step S109: Yes), the imaging apparatus 1 executes a playback display process of displaying the image corresponding to the image data recorded in the recording medium 220 on the rear display unit 216 (step S110). Subsequently to step S110, the imaging apparatus 1 proceeds to step S107.

When the imaging apparatus 1 is not set to the shooting mode in step S101 (step S101: No) and the imaging apparatus 1 is not set to the playback mode (step S109: No), the imaging apparatus 1 proceeds to step S107.

Next, the first shooting mode process in step S106 of FIG. 10 will be described in detail. FIG. 11 is a flowchart illustrating an outline of the first shooting mode process.

As illustrated in FIG. 11, when the eye sensor 215 has detected a photographer (step S201: Yes), the imaging apparatus 1 proceeds to step S218 described later. In contrast, when the eye sensor 215 has not detected a photographer (step S201: No), the imaging apparatus 1 proceeds to step S202 described later.

When the image stabilization unit 205 is working in step S202 (step S202: Yes), the imaging apparatus 1 proceeds to step S204 described later. In contrast, when the image stabilization unit 205 is not working (step S202: No), the imaging control unit 225g drives the image stabilization unit 205 (step S203). Subsequently to step S203, the imaging apparatus 1 proceeds to step S204.

Subsequently, when the eyepiece display unit 214 is working (step S204: Yes), the main body controller 225 stops the eyepiece display unit 214 (step S205). Subsequently to step S205, the imaging apparatus 1 proceeds to step S206. In contrast, when the eyepiece display unit 214 is not working (step S204: No), the imaging apparatus 1 proceeds to step S206.

After that, when the optical sighting unit 500 is working (step S206: Yes), the sighting control unit 225f stops the optical sighting unit 500 (step S207). Subsequently to step S207, the imaging apparatus 1 proceeds to step S208. In contrast, when the optical sighting unit 500 is not working (step S206: No), the imaging apparatus 1 proceeds to step S208.

Subsequently, when the rear display unit 216 is working (step S208: Yes), the imaging apparatus 1 proceeds to step S210. In contrast, when the rear display unit 216 is not working (step S208: No), the main body controller 225 drives the rear display unit 216 (step S209). Subsequently to step S209, the imaging apparatus 1 proceeds to step S210.

After that, the display control unit 225h displays a live-view image corresponding to the image data generated by the image sensor 203 on the rear display unit 216 (step S210).

Subsequently, when the screen of the rear display unit 216 is touched via the touch panel 217g (step S211: Yes), the imaging control unit 225g causes the AF processing unit 210 to execute an AF process on an area including the touch position (step S212). In this case, the AE processing unit 209 executes an AE process in accordance with the AF process of the AF processing unit 210.

After that, the imaging control unit 225g causes the image sensor 203 to execute still-image shooting (step S213) and records the image data generated by the image sensor 203 in the recording medium 220 (step S214). Subsequently to step S214, the imaging apparatus 1 returns to the main routine of FIG. 10.

When the screen of the rear display unit 216 is not touched via the touch panel 217g in step S211 (step S211: No), the imaging apparatus 1 proceeds to step S215.

Subsequently, when 1st is input from the release switch 217b (step S215: Yes), the AF processing unit 210 executes the AF process (step S216).

After that, when 2nd is input from the release switch 217b (step S217: Yes), the imaging apparatus 1 proceeds to step S213.

When 1st is not input from the release switch 217b in step S215 (step S215: No), the imaging apparatus 1 returns to the main routine of FIG. 10.

When 2nd is not input from the release switch 217b in step S217 (step S217: No), the imaging apparatus 1 returns to the main routine of FIG. 10.

When the image stabilization unit 205 is working in step S218 (step S218: Yes), the imaging apparatus 1 proceeds to step S220. In contrast, when the image stabilization unit 205 is not working (specifically, in a hold state) (step S218: No), the imaging control unit 225g drives the image stabilization unit 205 (step S219). Subsequently to step S219, the imaging apparatus 1 proceeds to step S220.

Subsequently, when the eyepiece display unit 214 is working (step S220: Yes), the imaging apparatus 1 proceeds to step S222. In contrast, when the eyepiece display unit 214 is not working (step S220: No), the main body controller 225 drives the eyepiece display unit 214 (step S221). Subsequently to step S221, the imaging apparatus 1 proceeds to step S222.

After that, when the optical sighting unit 500 is working (step S222: Yes), the sighting control unit 225f stops the optical sighting unit 500 (step S223). Specifically, the sighting control unit 225f causes a light source driving circuit (not illustrated) of the light source unit 501 to stop, emitting the light beam or the sighting mark. Subsequently to step S223, the imaging apparatus 1 proceeds to step S224. In contrast, when the optical sighting unit 500 is not working (for example, when the switch unit 213b has received the command signal (ON state) or when emission of the light beam or the sighting mark by the light source unit 501 is not stopped) (step S222: No), the imaging apparatus 1 proceeds to step S224.

Subsequently, when the rear display unit 216 is working (step S224: Yes), the main body controller 225 stops the rear display unit 216 (step S225). Subsequently to step S225, the imaging apparatus 1 proceeds to step S226. In contrast, when the rear display unit 216 is not working (step S224: No), the imaging apparatus 1 proceeds to step S226.

After that, the display control unit 225h displays a liveview image corresponding to the image data generated by the image sensor 203 on the eyepiece display unit 214 (step S226). Subsequently to step S226, the imaging apparatus 1 proceeds to step S215.

Figure 12A:
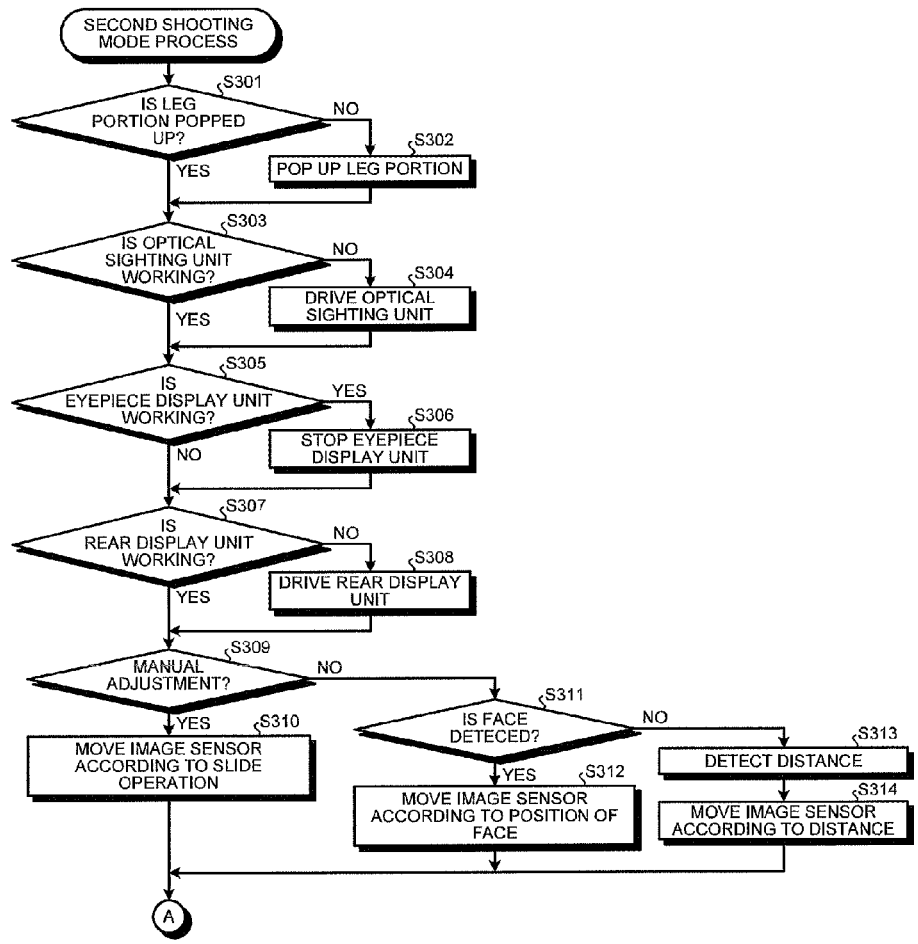
FIG. 12A is a flowchart illustrating an outline of a second shooting mode process in FIG. 10.
Figure 12B:
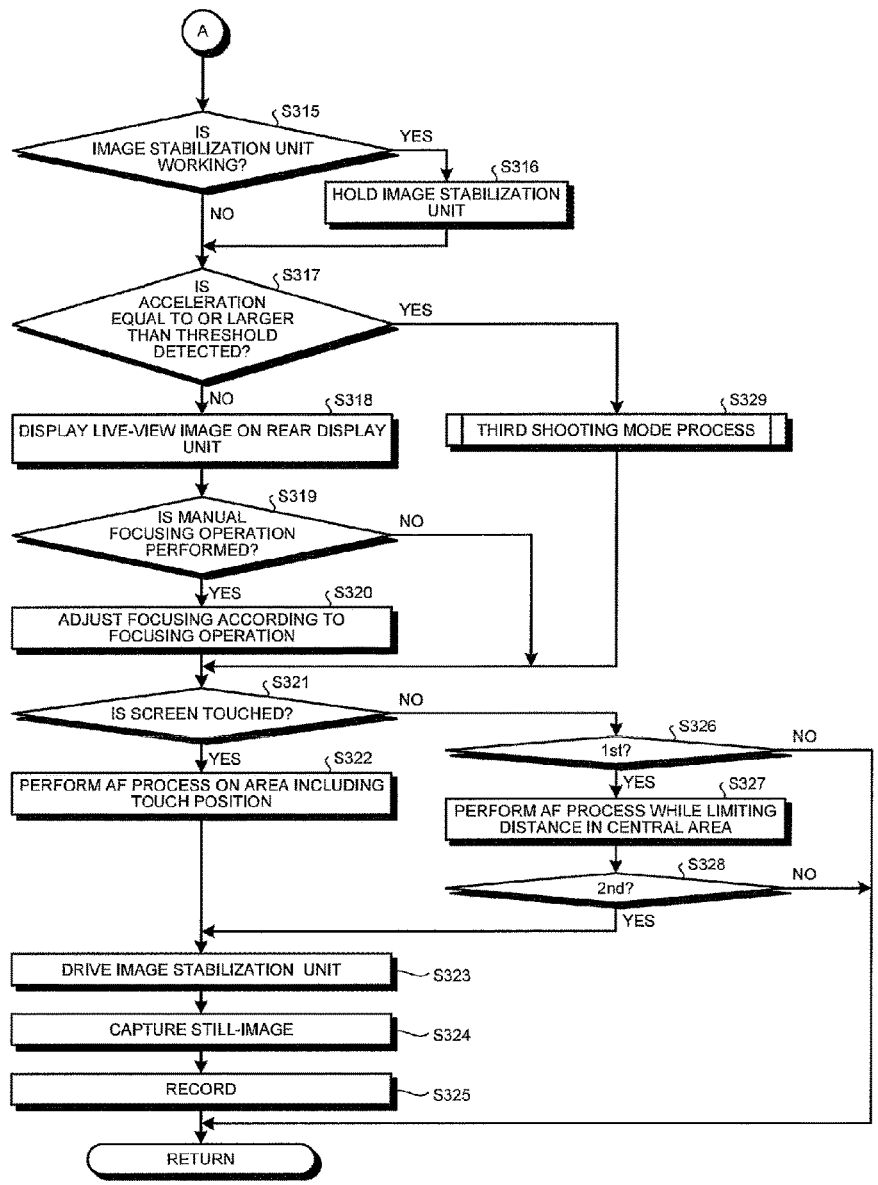
FIG. 12B is a flowchart illustrating an outline of a second shooting mode process in FIG. 10.

Next, the second shooting mode process in step S108 of FIG. 10 will be described in detail. FIGS. 12A and 12B are flowcharts illustrating an outline of the second shooting mode process.

As illustrated in FIGS. 12A and 12B, when the leg portion 212 is popped up (step S301: Yes), the imaging apparatus 1 proceeds to step S303. In contrast, when the leg portion 212 is not popped up (step S301: No), the main body controller 225 drives the pop-up unit 600 to cause the leg portion 212 to pop up from the main body portion 2 (step S302). Subsequently to step S302, the imaging apparatus 1 proceeds to step S303.

Subsequently, when the optical sighting unit 500 is working (step S303: Yes), the imaging apparatus 1 proceeds to step S305. In contrast, when the optical sighting unit 500 is not working (step S303: No), the sighting control unit 225f drives the optical sighting unit 500 (step S304). Specifically, the sighting control unit 225f causes the light beam or the sighting mark to be emitted from the light source unit 501. Subsequently to step S304, the imaging apparatus 1 proceeds to step S305.

After that, when the eyepiece display unit 214 is working (step S305: Yes), the main body controller 225 stops the eyepiece display unit 214 (step S306). Subsequently to step S306, the imaging apparatus 1 proceeds to step S307. In contrast, when the eyepiece display unit 214 is not working (step S305: No), the imaging apparatus 1 proceeds to step S307.

Subsequently, when the rear display unit 216 is working (step S307: Yes), the imaging apparatus 1 proceeds to step S309. In contrast, when the rear display unit 216 is not working (step S307: No), the main body controller 225 drives the rear display unit 216 (step S308). Subsequently to step S308, the imaging apparatus 1 proceeds to step S309.

After that, the main body controller 225 determines whether the movement of the image sensor 203 is realized by manual adjustment (step S309). Specifically, the main body controller 225 determines whether a position signal is input from the touch panel 217g. When the main body controller 225 determines that the movement of the image sensor 203 is realized by manual adjustment (step S309: Yes), the imaging apparatus 1 proceeds to step S310 described later. In contrast, when the main body controller 225 determines that the movement of the image sensor 203 is not realized by manual adjustment (step S309: No), the imaging apparatus 1 proceeds to step S311 described later.

In step S310, the imaging control unit 225g moves the image sensor 203 to a position corresponding to a slide operation on the rear display unit 216 via the touch panel 217g by driving the image stabilization unit 205.

Figure 13:
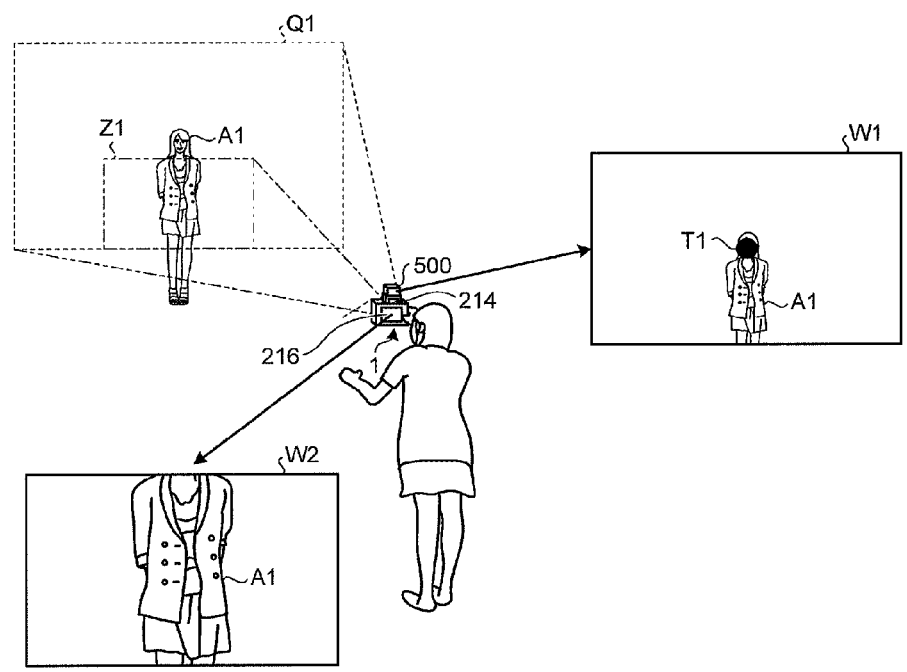
FIG. 13 is a diagram schematically illustrating a situation when a photographer captures an image of a subject using the optical sighting unit and the rear display unit of the imaging apparatus according to the first embodiment of the present invention.
Figure 14:
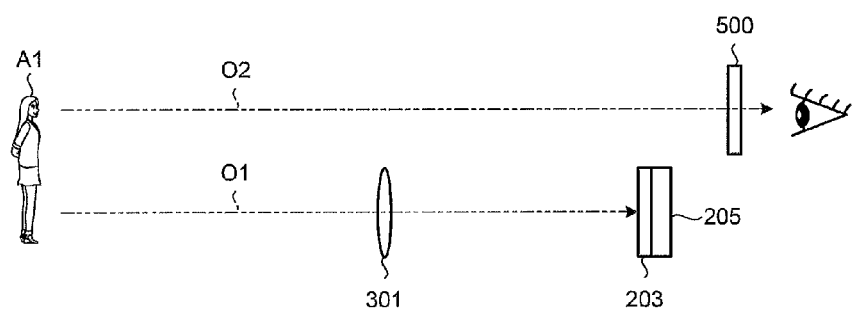
FIG. 14 is a diagram schematically illustrating a parallax between a zoom optical system and an optical sighting unit with respect to a subject under the situation illustrated in FIG. 13.
Figure 15:
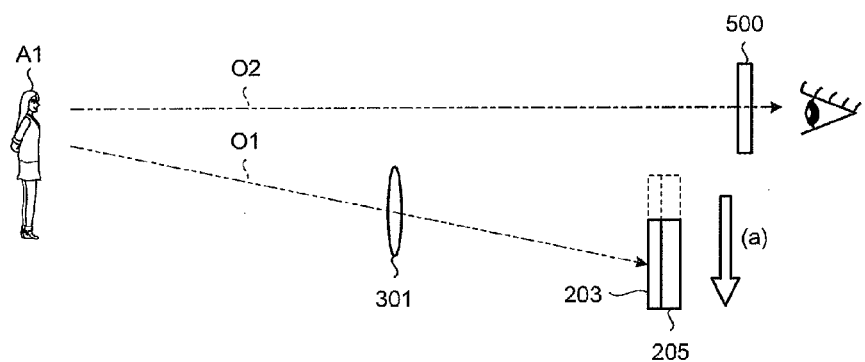
FIG. 15 is a diagram illustrating an example of an image displayed by the rear display unit according to a slide operation.
Figure 16A:
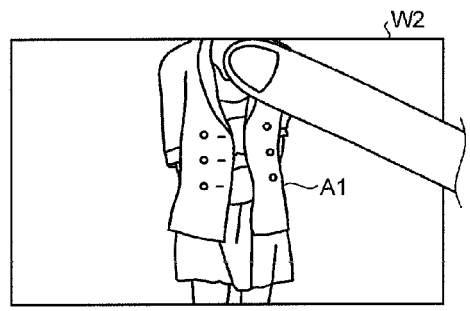
FIG. 16A is a diagram schematically illustrating the movement of an image sensor provided in the imaging apparatus according to the first embodiment of the present invention.
Figure 16B:
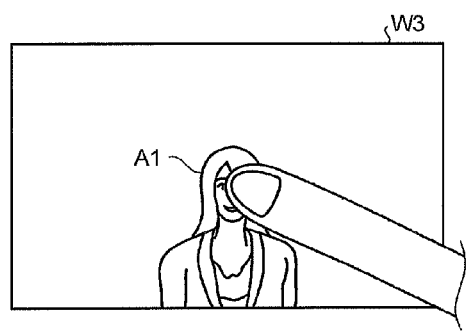
FIG. 16B is a diagram schematically illustrating the movement of an image sensor provided in the imaging apparatus according to the first embodiment of the present invention.

FIG. 13 is a diagram schematically illustrating a situation when a photographer captures an image of a subject using the optical sighting unit 500 and the rear display unit 216 of the imaging apparatus 1. FIG. 14 is a diagram schematically illustrating a parallax between the zoom optical system 301 and the optical sighting unit 500 with respect to the subject under the situation illustrated in FIG. 13. FIG. 15 is a diagram illustrating an example of an image that the rear display unit 216 displays according to the slide operation. FIGS. 16A and 16B are diagrams schematically illustrating the movement of the image sensor 203. In FIG. 13, an angle of view Z1 of the lens unit 3 is depicted by a two-dot chain line and a field of view area Q1 of the optical sighting unit 500 is depicted by a dot line.

As illustrated in FIG. 13, the photographer can perform framing of a subject A1 by aligning a light flux T1 emitted by the optical sighting unit 500 at a position near the face of the subject A1 in a field of view area W1 of the imaging apparatus 1. However, for example, when the distance from the imaging apparatus 1 to the subject A1 is a middle-range distance using the imaging apparatus 1, since a parallax occurs between the optical axis O2 of the optical sighting unit 500 and the optical axis O1 of the lens unit 3, an image W2 corresponding to the image data generated by the image sensor 203 is different from the field of view area W1 that the photographer sees on the optical sighting unit 500. Specifically, as illustrated in FIG. 14, since a parallax occurs between the optical axis O2 of the optical sighting unit 500 and the optical axis O1 of the lens unit 3, when the distance from the imaging apparatus 1 to the subject A1 is a middle-range distance, the parallax between the optical axis O2 of the optical sighting unit 500 and the optical axis O1 of the lens unit 3 increases. Thus, as illustrated in FIGS. 15, 16A, and 16B, the imaging control unit 225g drives the image stabilization unit 205 according to a slide operation (FIG. 16A→FIG. 16B) on the rear display unit 216 via the touch panel 217g to move the image sensor 203. For example, in the case illustrated in FIG. 15, the imaging control unit 225g drives the image stabilization unit 205 to move the image sensor 203 in a vertically downward direction (arrow (a)). In this way, as illustrated in FIGS. 16A and 16B, the image displayed by the rear display unit 216 changes from the live-view image W2 to a live-view image W3 (FIG. 16A→FIG. 16B). As a result, even when the distance from the imaging apparatus 1 to the subject A1 is a middle-range distance, it is possible to reduce the parallax between the optical sighting unit 500 and the lens unit 3.

Returning to FIG. 12A, the explanation of steps subsequent to step S311 will be continued. In step S311, when the face detection unit 225c detects the face of the subject in the image corresponding to the image data generated by the image sensor 203 (step S311: Yes), the imaging control unit 225g drives the image stabilization unit 205 to move the image sensor 203 so that the face of the subject detected by the face detection unit 225c is positioned at the center of the image (step S312). As a result, even when the distance from the imaging apparatus 1 to the subject is a middle-range distance or a near-range distance, it is possible to automatically reduce the parallax between the optical sighting unit 500 and the lens unit 3 and to capture an image in which the face of a person as a subject is positioned at the center of the image.

When the face detection unit 225c has not detected the face of the subject in the image corresponding to the image data generated by the image sensor 203 in step S311 (step S311: No), the imaging apparatus 1 proceeds to step S313.

Subsequently, the distance detection unit 225b detects the distance from the imaging apparatus 1 to the subject based on the point of focus of the lens unit 3 included in the lens information (step S313).

After that, the imaging control unit 225g drives the image stabilization unit 205 to move the image sensor 203 to a position corresponding to the distance from the imaging apparatus 1 to the subject detected by the distance detection unit 225b (step S314).

Subsequently to steps S310, S312, and S314, when the image stabilization unit 205 is working (step S315: Yes), the imaging control unit 225g causes the image stabilization unit 205 to hold (step S316). Subsequently to step S316, the imaging apparatus 1 proceeds to step S317. In contrast, when the image stabilization unit 205 is not working (step S315: No), the imaging apparatus 1 proceeds to step S317.

Figure 17:
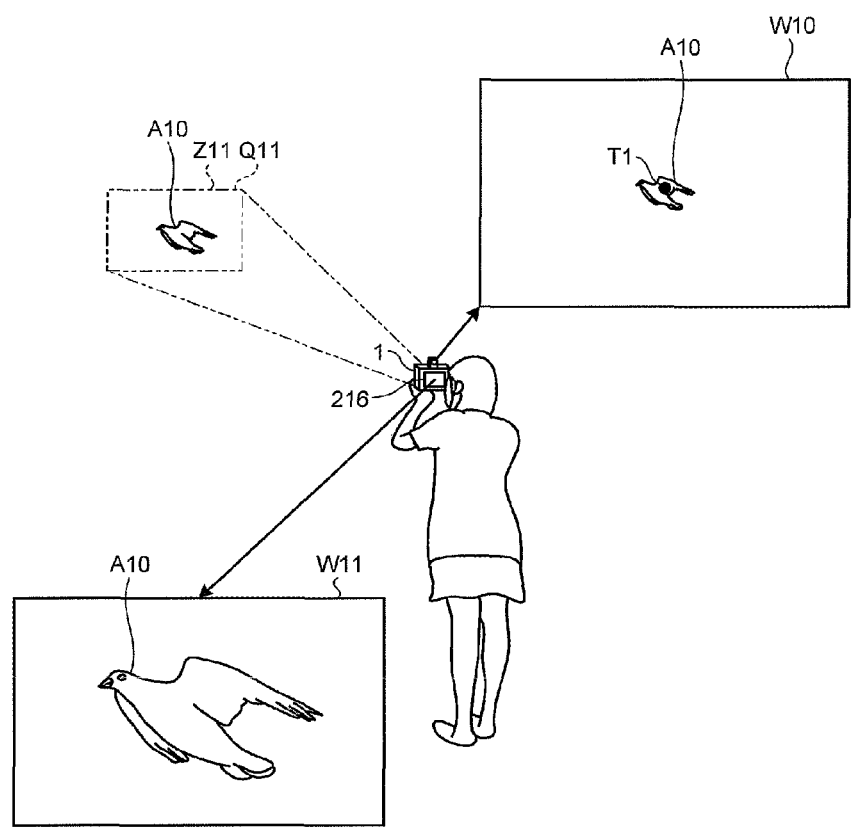
FIG. 17 is a diagram schematically illustrating a situation when shooting is performed while setting sights on a subject using the optical sighting unit of the imaging apparatus according to the first embodiment of the present invention.
Figure 18:
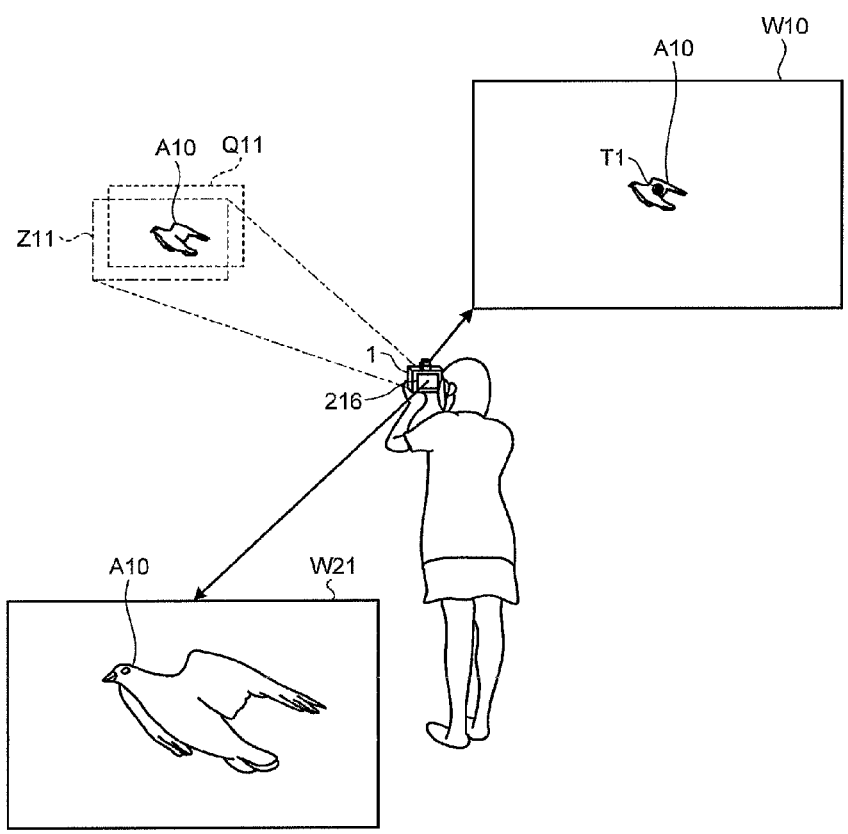
FIG. 18 is a diagram schematically illustrating a shift of a field of view area when shooting is performed while setting sights on a subject using an optical sighting unit and an image stabilization unit of the imaging apparatus according to the first embodiment of the present invention is driven.

Here, the reason why the image stabilization unit 205 is stopped will be described. FIG. 17 is a diagram schematically illustrating a situation when shooting is performed while setting sights on a subject A10 using the optical sighting unit 500. FIG. 18 is a diagram schematically illustrating a shift of the field of view area when shooting is performed while setting sights on the subject A10 using the optical sighting unit 500 when the image stabilization unit 205 is working. In FIGS. 17 and 18, a field of view area Q11 indicates the field of view area of the optical sighting unit 500, an area Z11 indicates the field of view area (imaging area) in which the image sensor 203 receives light via the lens unit 3. Moreover, in FIGS. 17 and 18, an image W10 corresponds to the field of view area Q11 and images W11 and W21 correspond to the image generated by the image sensor 203.

As illustrated in FIG. 17, when a photographer captures an image in such a composition as the image W11 by aligning the light beam or the sighting mark (light flux T1) emitted by the optical sighting unit 500 at the subject A10 in the field of view area Q11 and a blurring occurs in the imaging apparatus 1 during the driving of the image stabilization unit 205, the image stabilization unit 205 moves the image sensor 203 according to the acceleration detected by the blurring detection unit 218 in order to prevent a blur in the captured image due to the blurring. As a result, as illustrated in FIG. 18, the position of an area Z11 in which the image sensor 203 receives light moves, whereby a parallax occurs between the optical axis O2 of the optical sighting unit 500 and the optical axis O1 of the lens unit 3. Thus, in the present embodiment, when the imaging apparatus 1 performs the second shooting mode process (when the optical sighting unit 500 is driven), the driving of the image stabilization unit 205 is held (stopped) immediately before executing still-image shooting to thereby reduce the parallax between the optical sighting unit 500 and the lens unit 3. In this way, when the photographer performs shooting by aligning the light flux B1 at the subject A10 using the optical sighting unit 500, a sense of incongruity between the captured image and the composition when framing is performed on the optical sighting unit 500 is prevented.

Subsequently to step S316, or when the image stabilization unit 205 is not working in step S315 (step S315: No) and the blurring detection unit 218 has detected an acceleration equal to or larger than a threshold (step S317: Yes), the imaging apparatus 1 proceeds to step S329 described later. In contrast, when the blurring detection unit 218 has not detected an acceleration equal to or larger than the threshold (step S317: No), the imaging apparatus 1 proceeds to step S318 described later.

In step S318, the display control unit 225h displays a live-view image corresponding to the image data generated by the image sensor 203 on the rear display unit 216.

Subsequently, when a manual focusing operation of the lens unit 3 is performed via the lens operating unit 311 (step S319: Yes), the lens control unit 314 drives the focus drive unit 308 to move the focus optical system 307 along the optical axis O1 to thereby adjust the focusing of the lens unit 3 (step S320).

When the manual focusing operation of the lens unit 3 is not performed via the lens operating unit 311 in step S319 (step S319: No) and after step S320, the imaging apparatus 1 proceeds to step S321.

Subsequently, when the screen of the rear display unit 216 is touched via the touch panel 217g (step S321: Yes), the imaging control unit 225g drives the focus drive unit 308 via the lens control unit 314 to move the focus optical system 307 along the optical axis O1 to thereby execute an AF process of aligning the point of focus of the lens unit 3 at an area including the touch position (step S322).

Figure 19:
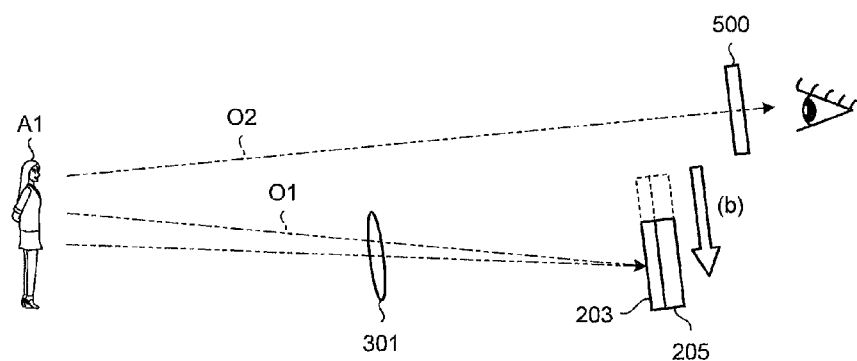
FIG. 19 is a diagram schematically illustrating the movement of an image sensor during the image stabilization of the imaging apparatus according to the first embodiment of the present invention.

After that, the imaging control unit 225g drives the image stabilization unit 205 (step S323). Specifically, as illustrated in FIG. 19, the imaging control unit 225g drives the image stabilization unit 205 to move the image sensor 203 in the direction (arrow (b)) for suppressing the image blur due to the camera shake based on the acceleration detected by the blurring detection unit 218. In this way, even when the photographer captures still-images using the imaging apparatus 1 and a blurring occurs in the imaging apparatus 1, it is possible to prevent an image blur in the captured image.

Subsequently, the imaging control unit 225g causes the image sensor 203 to execute still-image shooting (step S324) and records the image data generated by the image sensor 203 in the recording medium 220 (step S325). Subsequently to step S325, the imaging apparatus 1 returns to the main routine of FIG. 10.

When the screen of the rear display unit 216 is not touched via the touch panel 217g in step S321 (step S321: No), the imaging apparatus 1 proceeds to step S326.

Subsequently, when 1st is input from the release switch 217b (step S326: Yes), the imaging control unit 225g drives the focus drive unit 308 via the lens control unit 314 to execute the AF process of moving the focus optical system 307 along the optical axis O1 to limit the AF scanning distance of the focus optical system 307 in the central area of the field of view area of the imaging apparatus 1 to align the point of focus of the lens unit 3 (step S327). Specifically, the imaging control unit 225g executes the AF process by aligning the point of focus of the lens unit 3 at the center (for example, changing from a multi-spot AF process to a spot AF process) and moving (scanning) the focus optical system 307 by a specified distance range from the infinity side. In this way, since the time to move the focus optical system 307 can be shortened as compared to a normal AF process of moving the focus optical system 307 from the close-range side to the telephoto side, it is possible to execute a high-speed AF process. As a result, a shutter chance can be grasped reliably for a subject that moves at a high speed. Further, when a subject such as a bird in a tree is captured from a long-range distance by aligning the point of focus of the lens unit 3 at the center (spot AF), it is possible to prevent the point of focus of the lens unit 3 from being aligned at a branch or the like in front of the subject. Furthermore, when a mode of aligning the subject approximately at the center of an imaging range displayed on the optical sighting unit 500 is used and the focusing point of the AF process is not set at the center of the imaging range, it is possible to prevent the point of focus from being aligned at a position that is not intended by the photographer.

After that, when 2nd is input from the release switch 217b (step S328: Yes), the imaging apparatus 1 proceeds to step S323. In contrast, when 2nd is not input from the release switch 217b (step S328: No), the imaging apparatus 1 returns to the main routine of FIG. 10.

When 1st is not input from the release switch 217b in step S326 (step S326: No), the imaging apparatus 1 returns to the main routine of FIG. 10.

In step S329, the imaging apparatus 1 executes a third shooting mode process performed when a detailed composition is determined after a rough composition of the subject on the optical sighting unit 500 is determined.

Figure 20:
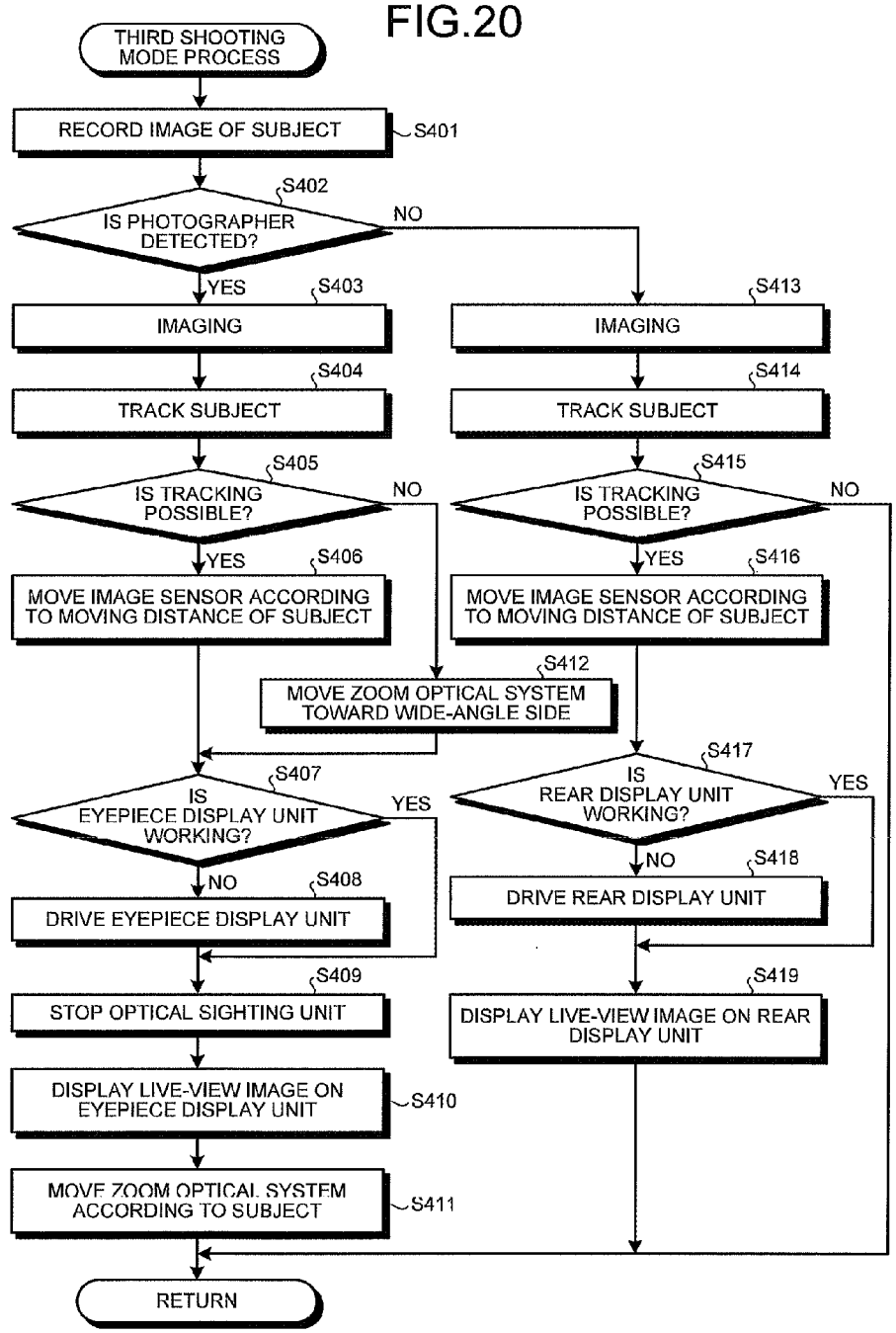
FIG. 20 is a flowchart illustrating an outline of a third shooting mode process in FIG. 12B.

FIG. 20 is a flowchart illustrating an outline of the third shooting mode process in step S329 of FIG. 12B.

As illustrated in FIG. 20, the main body controller 225 records the image data generated by the image sensor 203 in the SDRAM 221 (step S401).

Subsequently, when the eye sensor 215 detects a photographer (step S402: Yes), the imaging control unit 225g causes the image sensor 203 to execute imaging (step S403).

After that, the subject detection unit 225d tracks a subject in the image corresponding to the image data generated by the image sensor 203 (step S404).

Subsequently, when the subject detection unit 225d can track the subject (step S405: Yes), the imaging control unit 225g moves the image sensor 203 according to the moving distance of the subject (step S406).

After that, when the eyepiece display unit 214 is working (step S407: Yes), the imaging apparatus 1 proceeds to step S409. In contrast, when the eyepiece display unit 214 is not working (step S407: No), the main body controller 225 drives the eyepiece display unit 214 (step S408). Subsequently to step S408, the imaging apparatus 1 proceeds to step S409.

Subsequently, the main body controller 225 stops the optical sighting unit 500 (step S409) and the display control unit 225h displays a live-view image corresponding to the image data generated by the image sensor 203 on the eyepiece display unit 214 (step S410).

After that, the imaging control unit 225g drives the zoom drive unit 302 via the lens control unit 314 to move the zoom optical system 301 toward the wide-angle side or the telephoto side along the optical axis O1 according to the moving distance of the subject detected by the subject detection unit 225d (step S411). Subsequently to step S411, the flow proceeds to step S321 of FIG. 12B.

When the subject detection unit 225d cannot track the subject in step S405 (step S405: No), the imaging control unit 225g drives the zoom drive unit 302 via the lens control unit 314 to move the zoom optical system 301 toward the wide-angle side (step S412). In this case, the imaging control unit 225g moves the zoom optical system 301 toward the wide-angle side until the subject detection unit 225d detects the subject. Subsequently to step S412, the imaging apparatus 1 proceeds to step S407.

When the eye sensor 215 has not detected the photographer in step S402 (step S402: No), the imaging control unit 225g causes the image sensor 203 to capture the image data (step S413).

Subsequently, the subject detection unit 225d tracks a subject in the image corresponding to the image data generated by the image sensor 203 (step S414).

After that, when the subject detection unit 225d can track the subject (step S415: Yes), the imaging control unit 225g moves the image sensor 203 according to the moving distance of the subject (step S416).

Subsequently, when the rear display unit 216 is working (step S417: Yes), the imaging apparatus 1 proceeds to step S419. In contrast, when the rear display unit 216 is not working (step S417: No), the main body controller 225 drives the rear display unit 216 (step S418).

After that, the display control unit 225h displays a live-view image corresponding to the image data generated by the image sensor 203 on the rear display unit 216 (step S419). Subsequently to step S419, the imaging apparatus 1 proceeds to step S321 of FIG. 12B.

When the subject detection unit 225d cannot track the subject in step S415 (step S415: No), the imaging apparatus 1 proceeds to step S321 of FIG. 12B.

According to the first embodiment of the present invention described above, when the optical sighting unit 500 is driven, the mode switching unit 225e switches the shooting mode of the imaging apparatus 1 from the first shooting mode for shooting under the control based on the image data generated by the image sensor 203 to the second shooting mode for shooting under the control corresponding to the driving of the optical sighting unit 500. Thus, it is possible to perform shooting appropriate for the optical sighting unit 500.

According to the first embodiment of the present invention, when the mode switching unit 225e switches the shooting mode of the imaging apparatus 1 from the first shooting mode to the second shooting mode, the imaging control unit 225g holds the driving of the image stabilization unit 205. Thus, it is possible to reduce the parallax between the optical axis O1 of the lens unit 3 and the optical axis O2 of the optical sighting unit 500 occurring due to the image stabilization process.

According to the first embodiment of the present invention, the imaging control unit 225g drives the image stabilization unit 205 based on the distance from the imaging apparatus 1 to the subject detected by the distance detection unit 225b to move the position of the image sensor 203. Thus, it is possible to reduce the parallax between the optical axis O1 of the lens unit 3 and the optical axis O2 of the optical sighting unit 500 occurring during shooting in the telephoto or middle-range mode.

According to the first embodiment of the present invention, when a slide operation is performed via the touch panel 217g, the imaging control unit 225g drives the image stabilization unit 205 to move the image sensor 203 to the position corresponding to the slide operation. Thus, it is possible to reduce the parallax between the lens unit 3 and the optical sighting unit 500.

According to the first embodiment of the present invention, when the mode switching unit 225e switches the shooting mode of the imaging apparatus 1 from the first shooting mode to the second shooting mode, the imaging control unit 225g sets the point of focus of the lens unit 3 at the center of the image. Thus, it is possible to capture an image in which the subject is brought into focus.

According to the first embodiment of the present invention, since many digital cameras having an image stabilization mechanism mounted thereon are configured to correct a blurring during framing, the movement of the digital camera may not be identical to the movement of the imaging range. Thus, any one of the image stabilization unit 205 and the lens-shake correction unit 310 is temporarily stopped during the driving of the optical sighting unit 500. In this way, it is possible to prevent exposure from being started in a state in which the position of the light beam or the sighting mark indicated by the optical sighting unit 500 is shifted from the center of the imaging range that is actually captured.

Figure 21:
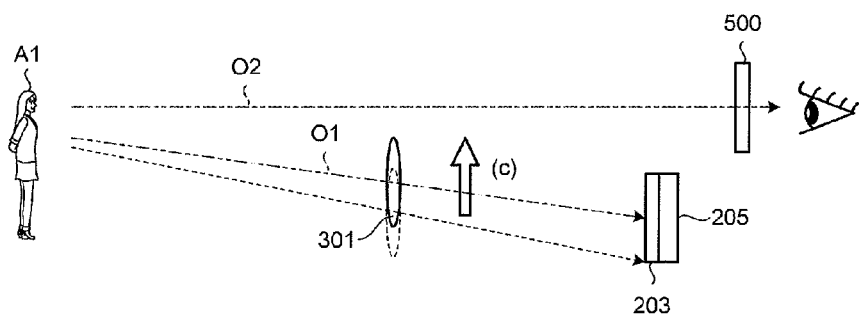
FIG. 21 is a diagram schematically illustrating the movement of a zoom optical system during the image stabilization by a lens-shake correction unit of the imaging apparatus according to a modification of the first embodiment of the present invention.

According to the first embodiment of the present invention, the imaging control unit 225g may drive the lens-shake correction unit 310 via the lens control unit 314 when the optical sighting unit 500 is driven as illustrated in FIG. 21 to thereby move the positions of the zoom optical system 301 and the focus optical system 307 (see arrow (c) in FIG. 21). By doing so, the parallax between the optical sighting unit 500 and the lens unit 3 may be automatically reduced.

According to the first embodiment of the present invention, the display control unit 225h may adjust the brightness or the size of the light beam or the sighting mark emitted by the light source unit 501 of the optical sighting unit 500 based on the brightness of the field of view area. In this way, it is possible to set sights on the subject with brightness optimal to the environment of the imaging apparatus 1.

According to the first embodiment of the present invention, the display control unit 225h may naturally change the color, shape, or the like of a frame corresponding to an angle of view according to the type of a subject (for example, a face or an animal) and use the frame as the light beam or the sighting mark emitted from the light source unit 501 of the optical sighting unit 500.

According to the first embodiment of the present invention, although a half mirror is used as the optical element 502, the optical element 502 may be configured by combining a light-guiding plate formed of a holographic device having a dielectric multilayer film formed thereon, a prism, and the like.

According to the first embodiment of the present invention, when the imaging control unit 225g drives the optical sighting unit 500, the imaging control unit 225g performs imaging control that changes the driving control of the image stabilization unit 205 and/or the driving control of the point of focus of the lens unit 3 as the imaging control corresponding to the driving of the optical sighting unit 500. The shooting parameter of the imaging apparatus 1 may be changed. Specifically, when the optical sighting unit 500 is driven, the imaging control unit 225g may perform shooting under the control in which the shooting parameters (for example, an aperture, an exposure value, a shutter speed, an ISO sensitivity, a gradation, a white balance, and a chroma) are changed. For example, when the optical sighting unit 500 is driven, the imaging control unit 225g may perform shooting under the control in which shooting parameters are changed such that the aperture and the ISO sensitivity are increased and the shutter speed is increased. By doing so, when imaging a subject such as a bird in a telephoto mode, it is possible to perform the imaging while bringing the subject and a surrounding scene into focus.

Second Embodiment

Next, a second embodiment of the present invention will be described. An imaging apparatus according to the second embodiment has a different configuration and executes a different process from those of the imaging apparatus according to the first embodiment described above. Thus, in the following description, the configuration of the imaging apparatus according to the second embodiment will be described first, and then the process executed by the imaging apparatus according to the second embodiment will be described. The same elements as those of the imaging apparatus 1 according to the first embodiment described above will be denoted by the same reference signs and the explanation thereof will be omitted.

[Configuration of Imaging Apparatus]

Figure 23A:
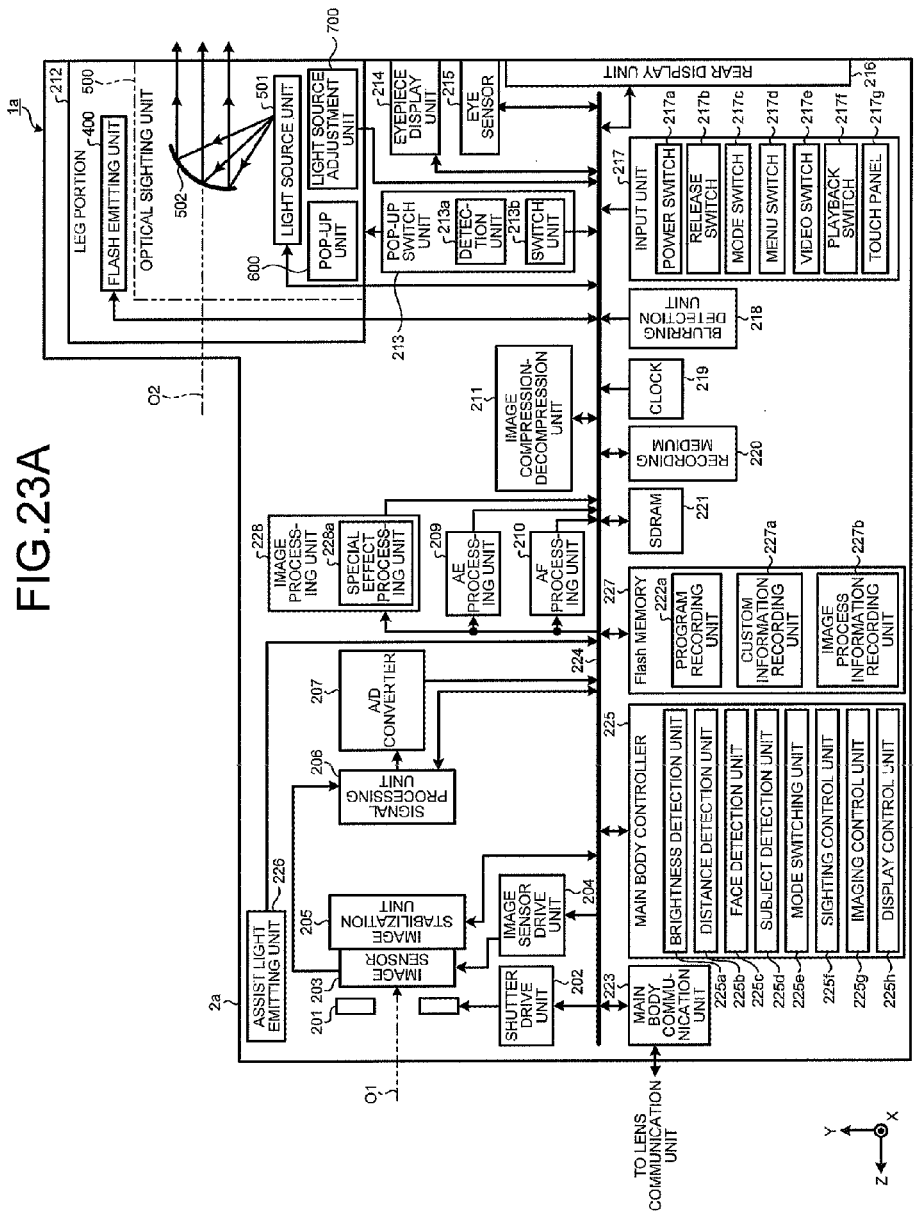
FIG. 23A is a block diagram illustrating a functional configuration of an imaging apparatus according to a second embodiment of the present invention.
Figure 23B:
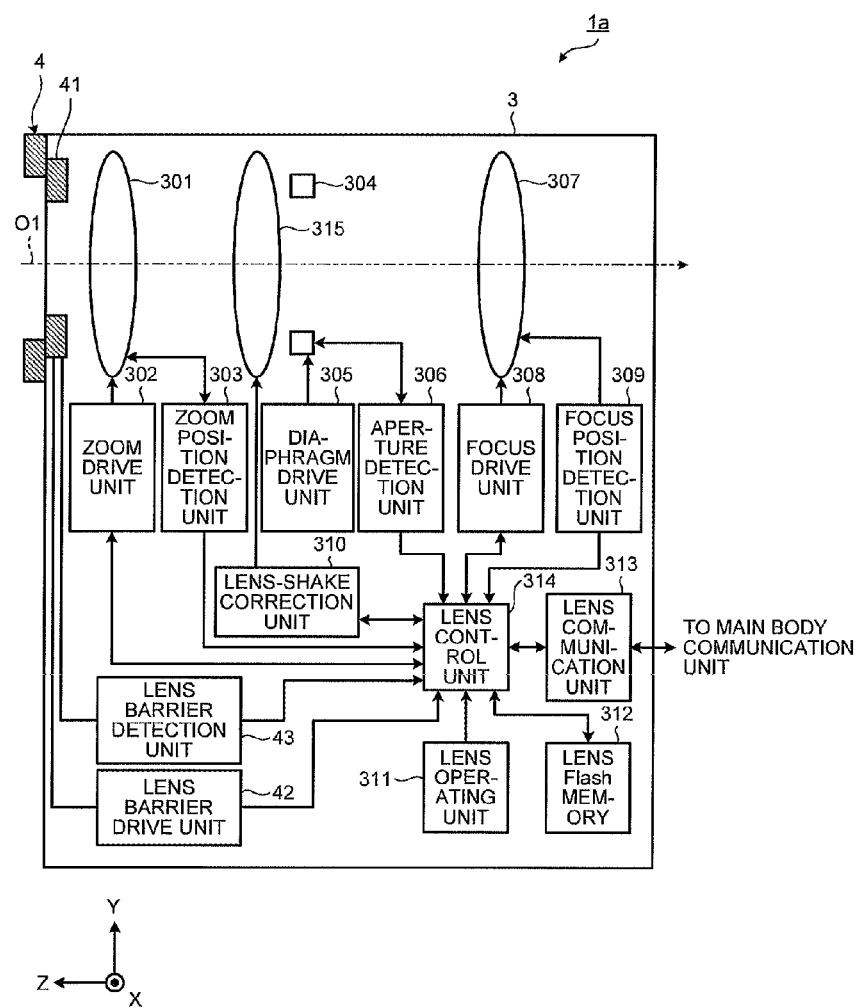
FIG. 23B is a block diagram illustrating a functional configuration of an imaging apparatus according to the second embodiment of the present invention.

FIGS. 23A and 23B are block diagrams illustrating a functional configuration of the imaging apparatus according to the second embodiment. An imaging apparatus 1a illustrated in FIGS. 23A and 23B includes a main body portion 2a, a lens unit 3, and a lens barrier mechanism 4.

[Configuration of Main Body Portion]

The main body portion 2a includes an assist light emitting unit 226 in addition to the elements of the main body portion 2 according to the first embodiment described above. Further, the main body portion 2a includes a flash memory 227 and an image processing unit 228 instead of the flash memory 222 and the image processing unit 208 of the main body portion 2 according to the first embodiment described above, respectively.

The assist light emitting unit 226 emits assist light to the field of view area of the imaging apparatus 1a during an auto-focus process for automatically focusing the imaging apparatus 1a. The assist light emitting unit 226 is configured using a lamp that emits infrared light, a driving circuit, and the like.

The flash memory 227 includes a program recording unit 222a, a custom information recording unit 227a, and an image process information recording unit 227b.

The custom information recording unit 227a records custom information that can be set to the imaging apparatus 1a. FIG. 24 is a diagram illustrating a portion of the custom information recorded by the custom information recording unit 227a.

Information that the photographer can set to the imaging apparatus 1a is recorded a custom information table T10 illustrated in FIG. 24. Moreover, items (operations) of which the setting can be changed are illustrated in T10a (first column) of the custom information table. The information (which is set during shipment by manufacturers) during initial setting of the item designated in T10a (first column) is illustrated in T10b (second column) of the custom information table. The specific information that can be set for the item designated in T10a (first column) is illustrated in T10c (third column) of the custom information table. Specifically, focal distance information, AF operating conditions, special effects, and image stabilization operating conditions are recorded in T10a of the custom information table, respectively. For example, the Max value (Tele) of the focal distance of the zoom optical system 301 and the Max value to Min value (Tele to Wide) of the lens unit 3 when the optical sighting unit 500 is driven are recorded in the focal distance information.

Moreover, an AF mode (C-mode), an AF area (entire area), and the state (emission inhibited) of an assist light-emitting unit (AF illuminator) during driving of the optical sighting unit 500 are recorded in the AF operating conditions. Further, a plurality of AF modes (for example, a C-mode (a mode of tracking a subject while continuously doing AF on the subject), an S-mode (single mode), and an AF-inhibited mode) that can be set to the imaging apparatus 1a is recorded in the AF operating conditions.

Further, the presence or absence of an image process that can be selected for the imaging apparatus 1a when the optical sighting unit 500 is driven is recorded in the special effects. For example, fisheye (inhibited), pinhole (inhibited), fantastic focus (inhibited), diorama (inhibited), toy photo (inhibited), pop art (allowed), rough monochrome (allowed), and dramatic tone (allowed) are described.

Moreover, the setting of the image stabilization during driving of the optical sighting unit 500 is described in the image stabilization operating conditions. Specifically, the setting of the image stabilization during driving of the optical sighting unit 500 is described in the image stabilization operating conditions. Examples of the image stabilization operation include an electronic image stabilization operation and an optical image stabilization operation, and the conditions of the respective operations can be set (see FIG. 24). More specifically, the electronic image stabilization operating conditions include the operating conditions when a still-image shooting mode is selected and the operating conditions when a video shooting mode is selected, which can be set. Moreover, in the still-image shooting mode, any one of: (1) Allowed during live-view, indicating that the image stabilization is allowed during a live-view operation; (2) Allowed during first release only, indicating that the image stabilization is allowed during the first release only (the image stabilization is allowed when the release button is half-pressed only); and (3) Operation inhibited can be selected. In the video shooting mode, any one of: (1) Operation allowed; and (2) Operation inhibited can be selected. Further, the optical image stabilization operating conditions that can be selected include any one of Operation allowed during still-image shooting and Operation inhibited. The operation during the still-image shooting includes a shooting operation in the still-image shooting mode and a still-image shooting operation in the video shooting mode (a imaging device that can acquire a still-image with a specified operation during video shooting is present). Further, the initial setting conditions of the electronic image stabilization operating conditions are set as follows. Specifically, when a still-image shooting mode is selected as the mode of the imaging device, the electronic image stabilization operation during the live-view mode is allowed. When a video shooting mode is selected as the mode of the imaging device, the electronic image stabilization operation is allowed. The operation in a still-image shooting operation is allowed as the initial setting conditions of the optical image stabilization operating conditions. Unless these initial setting conditions are not changed by the user, the image stabilization is set during the driving of the optical sighting unit 500.

Here, the content of the image process of the special effects of FIG. 24 will be described.

The fantastic focus is processing to provide a soft focus effect in which blurring processing is performed on the entire image and the blurred image and the image before blurring are synthesized at a certain ratio. The fantastic focus forms or generates an image with a beautiful and fantastic atmosphere as if being bathed in happy light while remaining details of a subject in a soft tone by performing tone curve processing that increases luminance at intermediate levels. The fantastic focus is realized by combining image processing operations such as, for example, tone curve processing, blurring processing, alpha blend processing, and image synthesis processing.

The pop art is processing to colorfully enhance colors to represent a cheerful and enjoyable atmosphere. The pop art is realized by combining, for example, the chroma enhancement processing and the contrast enhancement processing. The pop art produces an effect of high contrast and high chroma as a whole.

The pinhole is processing to apply toy photo (pinhole) which provides an effect as if looking into from a hole by darkening peripheral portions of an image by shading. The details of the toy photo will be described below.

The toy photo is processing which produces an effect as if looking into an unusual space from a hole and straying into the unusual space by making an image so that the larger the distance from the center of the image is, the smaller (the darker) the luminance is. The toy photo is realized by combining image processing operations such as, low-pass filter processing, white balance processing, contrast processing, hue/chroma processing, and shading processing in which the more peripheral to a luminance signal, the smaller a coefficient is multiplied (for detailed contents of the toy photo and the shading, for example, see Japanese Laid-open Patent Publication No. 2010-74244).

The rough monochrome is processing to represent forcefulness and roughness of a monochrome image by adding high contrast and granular noise of film. The rough monochrome is realized by combining edge enhancement processing, level correction optimization processing, noise pattern superimposition processing, synthesis processing, contrast processing, and the like (for detailed contents of the rough monochrome, for example, see Japanese Laid-open Patent Publication No. 2010-62836). Among them, the noise pattern superimposition processing (noise addition processing) is processing to add a noise pattern image created in advance to the original image. For example, the noise pattern image may be generated based on random numbers by generating the random numbers.

The diorama is processing which creates an atmosphere as if seeing a miniature model or a toy on a screen by blurring peripheral edge portions of an image of high contrast and high chroma. The diorama is realized by combining, for example, hue/chroma processing, contrast processing, peripheral blurring processing, and synthesis processing. Among them, the peripheral blurring processing is processing that performs low-pass filter processing while changing a low-pass coefficient according to a position in an image so that the greater the distance from the center of the image, the greater the degree of blurring. As the peripheral blurring processing, only upper and lower portions of the image or only left and right portions of the image may be blurred.

Returning to FIG. 23A, the explanation of the imaging apparatus 1a will be continued.

The image process information recording unit 227b records the parameters of the image process executed by a special effect processing unit 228a described later. Specifically, the image process information recording unit 227b records the parameters of the image process corresponding to the type of the special effects described above.

The image processing unit 228 acquires image data from the SDRAM 221 via the bus 224 and performs various image processes on the acquired image data (RAW data) to generate processed image data. The processed image data is output to the SDRAM 221 via the bus 224. The image processing unit 228 has the special effect processing unit 228a.

The special effect processing unit 228a performs an image process corresponding to the special effect selected by the photographer via the input unit 217 by referring to the image process information recording unit 227b. Specifically, the special effect processing unit 228a performs an art effect process that causes a visual effect by performing a plurality of image processes on one item of image data to generate processed image data (hereinafter referred to as "special effect image data").

[Process by Imaging Apparatus]

Figure 25B:
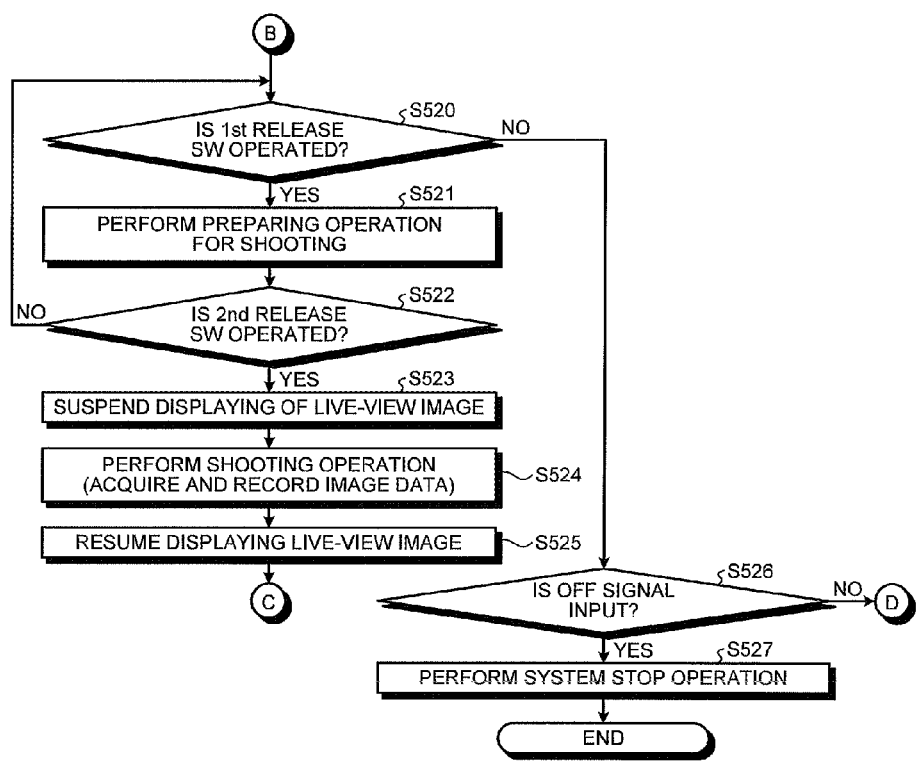
FIG. 25B is a flowchart illustrating an outline of a process executed by the imaging apparatus according to the second embodiment of the present invention.

The process executed by the imaging apparatus 1a having the above-described configuration will be described. FIGS. 25A and 25B are flowcharts illustrating an outline of the process executed by the imaging apparatus 1a.

As illustrated in FIG. 25A, first, the imaging apparatus 1a executes a power activation process of activating the power (step S501).

Subsequently, when an activation factor of the imaging apparatus 1a is a first activation factor (specifically, when the power switch 217a is operated) (step S502: First activation factor), the imaging apparatus 1a executes a first activation process (step S503).

[First Activation Process]

Figure 26:
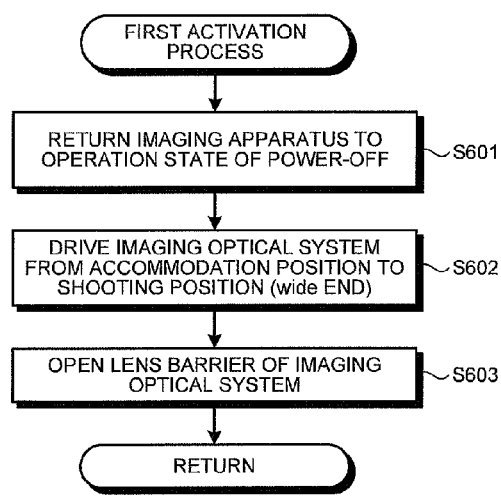
FIG. 26 is a flowchart illustrating an outline of a first activation process in FIG. 25A.

FIG. 26 is a flowchart illustrating an outline of a first activation process of step S503 in FIG. 25A.

As illustrated in FIG. 26, the main body controller 225 returns the imaging apparatus 1a to an operation state of power-OFF (step S601).

Subsequently, the main body controller 225 drives the zoom drive unit 302 and the focus drive unit 308 to drive the imaging optical system (i.e., the zoom optical system 301, the focus optical system 307, and the correction lens 315) from an accommodation position to a shooting position (Wide end) (step S602).

After that, the main body controller 225 drives the lens barrier drive unit 42 to open the lens barrier 41 (step S603). Subsequently to step S603, the imaging apparatus 1a returns to the main routine of FIG. 25A to proceed to step S505 described later.

Returning to FIG. 25A, the explanation will be continued.

When the activation factor of the imaging apparatus 1a is a second activation factor (specifically, when the leg portion 212 pops up and the power of the imaging apparatus 1a is turned on) in step S502 (step S502: Second activation factor), the imaging apparatus 1a executes a second activation process (step S504).

[Second Activation Process]

Figure 27:
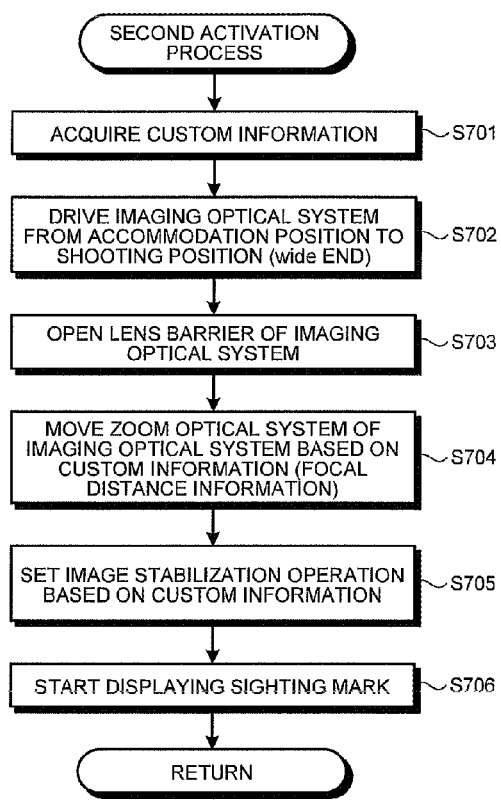
FIG. 27 is a flowchart illustrating an outline of a second activation process in FIG. 25A.

FIG. 27 is a flowchart illustrating an outline of the second activation process of step S504 in FIG. 25A.

As illustrated in FIG. 27, first, the main body controller 225 acquires custom information from the custom information recording unit 227a of the flash memory 227 (step S701). A method of setting the custom information will be described later.

Subsequently, the main body controller 225 drives the zoom drive unit 302 and the focus drive unit 308 to drive the imaging optical system (i.e., the zoom optical system 301, the focus optical system 307, and the correction lens 315) from an accommodation position to a shooting position (Wide end) (step S702).

After that, the main body controller 225 drives the lens barrier drive unit 42 to open the lens barrier 41 (step S703).

Subsequently, the main body controller 225 causes the zoom drive unit 302 to move the zoom optical system 301 of the imaging optical system to a telephoto position set in advance by the photographer based on the custom information (focal distance information) (step S704).

After that, the main body controller 225 performs the settings of the image stabilization operation to the imaging apparatus 1a based on the custom information (step S705). When video shooting or live-view shooting is performed, the main body controller 225 sets image stabilization for the shift of the image sensor 203 and the electronic image stabilization. Here, the image stabilization for the shift of the image sensor 203 is correction to suppress an image blur due to a camera shake by driving the image stabilization unit 205 based on the detection result of the blurring detection unit 218 to move the image sensor 203 with respect to the plane orthogonal to the optical axis O1. Moreover, the electronic image stabilization is correction to suppress an image blur due to a camera shake by moving the imaging area of the image sensor 203 based on the detection result by the blurring detection unit 218.

Subsequently, the main body controller 225 causes the optical sighting unit 500 to start displaying the sighting mark by driving the light source unit 501 (step S706). Subsequently to step S706, the imaging apparatus 1a returns to the main routine of FIG. 25A to proceed to step S505 described later.

Returning to FIG. 25A, the explanation of steps subsequent to step S505 will be continued.

In step S505, the display control unit 225h starts displaying a live-view image so that live-view images corresponding to the image data successively generated by the image sensor 203 are sequentially displayed on the rear display unit 216 or the eyepiece display unit 214.

Subsequently, when the menu switch 217d is operated and an operation of setting the custom information is performed (step S506: Yes), the imaging apparatus 1a executes a custom information setting process of setting the custom information (step S507).

[Custom Information Setting Process]

Figure 28:
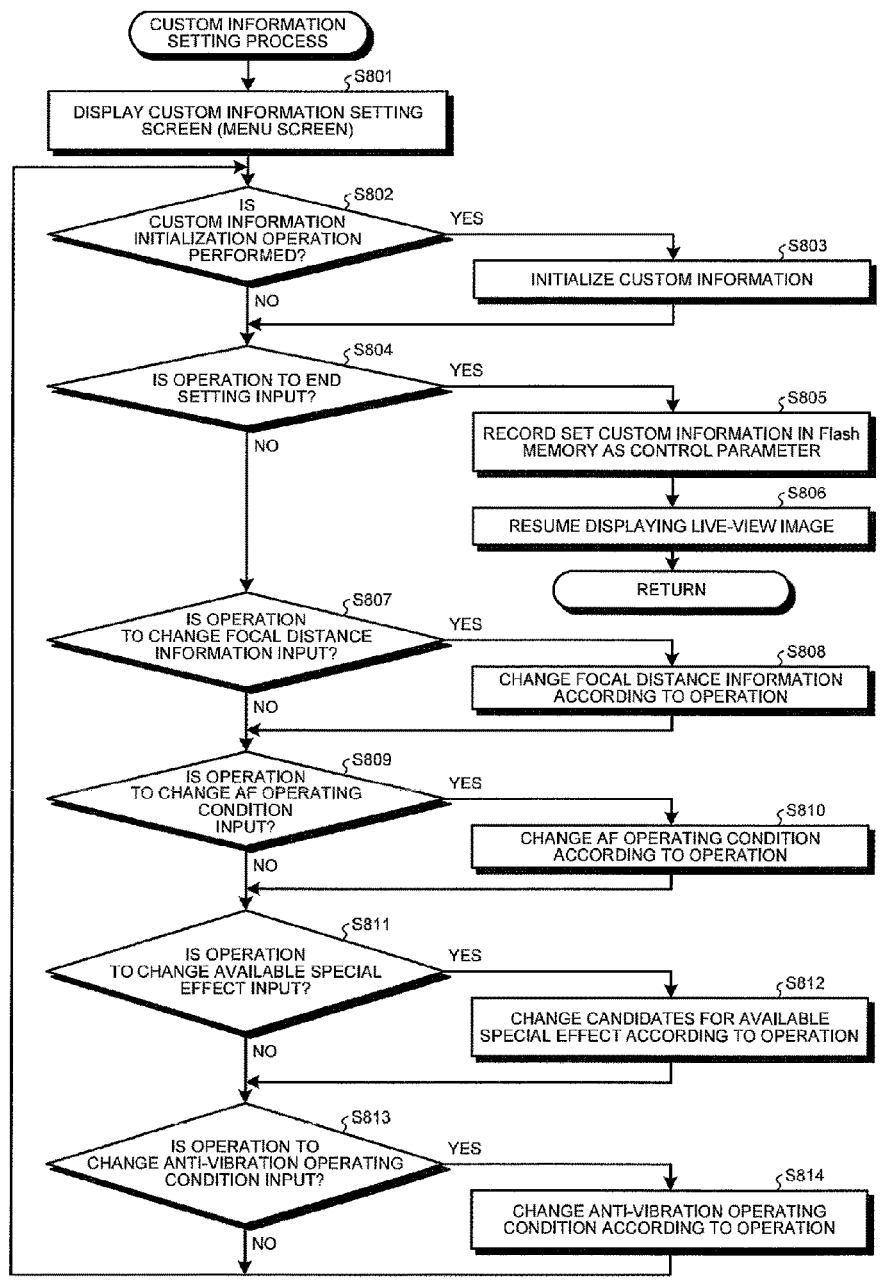
FIG. 28 is a flowchart illustrating an outline of a custom information setting process in FIG. 25A.

FIG. 28 is a flowchart illustrating an outline of a custom information setting process of step S507 in FIG. 25A. The operation disclosed herein supports an operation of changing the item designated in T10a (first column) of the custom information table based on the information disclosed in T10c (third column) of the custom information table according to the operation of the user.

As illustrated in FIG. 28, the display control unit 225h displays a custom information setting screen (menu screen) on the rear display unit 216 or the eyepiece display unit 214 (step S801).

Subsequently, when a custom information initialization operation is input via the input unit 217 (step S802: Yes), the main body controller 225 initializes the custom information recorded by the custom information recording unit 227a of the flash memory 227 (step S803). Specifically, the main body controller 225 initializes the custom information to the state during shipment by manufacturers. Specifically, the item designated in T10a (first column) of the custom information table is set to the state illustrated in T10b (second column) of the custom information table (see FIG. 24).

Subsequently to step S803, the imaging apparatus 1a proceeds to step S804 described later.

When a custom information initialization operation is not input via the input unit 217 in step S802 (step S802: No), the imaging apparatus 1a proceeds to step S804 described later.

Subsequently, when an operation to end the custom information setting operation is input via the input unit 217 (step S804: Yes), the main body controller 225 records the set custom information as the control parameters of the flash memory 227 (step S805).

After that, the display control unit 225h resumes displaying a live-view image such that live-view images corresponding to the image data successively generated by the image sensor 203 are sequentially displayed on the rear display unit 216 or the eyepiece display unit 214 (step S806). Subsequently to step S806, the imaging apparatus 1a returns to the main routine of FIG. 25A to proceed to step S508 described later.

If the operation to end the custom information setting operation is not input via the input unit 217 in step S804 (step S804: No), the imaging apparatus 1a proceeds to step S807.

Subsequently, when an operation to change a focal distance information is input via the input unit 217 (step S807: Yes), the main body controller 225 changes the focal distance information in the custom information according to the operation of the input unit 217 (step S808). Subsequently to step S808, the imaging apparatus 1a proceeds to step S809 described later.

If the operation to change the focal distance information is not input via the input unit 217 in step S807 (step S807: No), the imaging apparatus 1a proceeds to step S809.

Subsequently, when an operation to change an AF operating condition is input via the input unit 217 (step S809: Yes), the main body controller 225 changes the AF operating conditions according to the operation of the input unit 217 (step S810). Subsequently to step S810, the imaging apparatus 1a proceeds to step S811 described later.

If the operation to change the AF operating condition is not input via the input unit 217 in step S809 (step S809: No), the imaging apparatus 1a proceeds to step S811.

Subsequently, when an operation to change an available special effect is input via the input unit 217 (step S811: Yes), the main body controller 225 changes candidates for available special effects according to the operation of the input unit 217 (step S812). Subsequently to step S812, the imaging apparatus 1a proceeds to step S813 described later.

If the operation to change the available special effect is not input via the input unit 217 in step S811 (step S811: No), the imaging apparatus 1a proceeds to step S813.

Subsequently, when an operation to change an anti-vibration (image stabilization) operating condition is input via the input unit 217 (step S813: Yes), the anti-vibration operating condition is changed according to the operation of the input unit 217 (step S814). Subsequently to step S814, the imaging apparatus 1a returns to step S802 described above.

If the operation to change the anti-vibration operating condition is not input via the input unit 217 in step S813 (step S813: No), the imaging apparatus 1a returns to step S802 described above.

Returning to FIG. 25A, the explanation will be continued.

When the menu switch 217d is not operated and a custom information setting operation is not input in step S506 (step S506: No), the imaging apparatus 1a proceeds to step S508 described later.

Subsequently, when a special effect setting operation is input via the input unit 217 (step S508: Yes), the imaging apparatus 1a executes a special effect setting process (step S509).

[Special Effect Setting Process]

Figure 29:
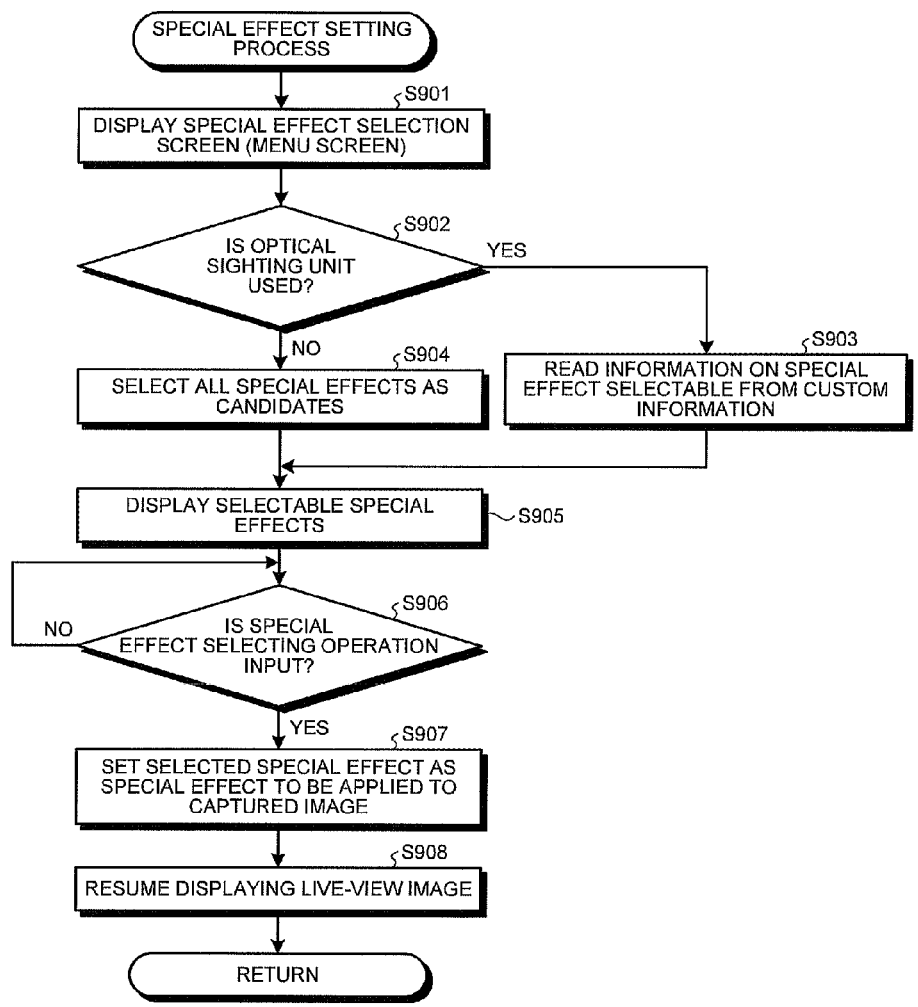
FIG. 29 is a flowchart illustrating an outline of a special effect setting process in FIG. 25A.

FIG. 29 is a flowchart illustrating an outline of the special effect setting process of step S509 in FIG. 25A.

As illustrated in FIG. 29, the display control unit 225h displays a selection screen (menu screen) for selecting special effects on the rear display unit 216 or the eyepiece display unit 214 (step S901).

Subsequently, when the optical sighting unit 500 is used (specifically, when the light source unit 501 is working) (step S902: Yes), the main body controller 225 acquires information on the special effects selectable from the custom information recorded in the custom information recording unit 227a of the flash memory 227 (step S903). Subsequently to step S903, the imaging apparatus 1a proceeds to step S905 described later.

When the optical sighting unit 500 is not used in step S902 (step S902: No), the main body controller 225 sets special effects to be selectable (step S904). Subsequently to step S904, the imaging apparatus 1a proceeds to step S905 described later.

Subsequently, the display control unit 225h displays selectable special effects on the rear display unit 216 or on the eyepiece display unit 214 (step S905).

After that, when a special effect selecting operation is input via the input unit 217 (step S906: Yes), the imaging apparatus 1a proceeds to step S907. In contrast, if the special effect selecting operation is not input via the input unit 217 (step S906: No), the imaging apparatus 1a continues this determination.

In step S907, the main body controller 225 sets the selected special effect as the special effect to be applied to the captured image.

After that, the display control unit 225h resumes displaying a live-view image such that live-view images corresponding to the image data successively generated by the image sensor 203 are sequentially displayed on the rear display unit 216 or the eyepiece display unit 214 (step S908). Subsequently to step S908, the imaging apparatus 1a returns to the main routine of FIG. 25A to proceed to step S510 described later.

Returning to FIG. 25A, the explanation will be continued.

When the special effect setting operation is not input via the input unit 217 in step S508 (step S508: No), the imaging apparatus 1a proceeds to step S510 described later.

Subsequently, when the leg portion 212 is popped up (step S510: Yes), the imaging apparatus 1a executes the second activation process described above (step S511). Subsequently to step S511, the imaging apparatus 1a proceeds to step S512 described later.

When the leg portion 212 is not popped up in step S510 (step S510: No), the imaging apparatus 1a proceeds to step S512 described later.

Subsequently, when the leg portion 212 is popped down (step S512: Yes), the sighting control unit 225f stops displaying the sighting mark by stopping the light source unit 501 (step S513). Subsequently to step S513, the imaging apparatus 1a proceeds to step S514 described later.

When the leg portion 212 is not popped down in step S512 (step S512: No), the imaging apparatus 1a proceeds to step S514 described later.

Subsequently, when the driving of the flash emitting unit 400 is allowed (step S514: Yes), the main body controller 225 sets a strobe mode and starts the operation of a strobe circuit (not illustrated) (step S515). Subsequently to step S515, the imaging apparatus 1a proceeds to step S516 described later.

When the driving of the flash emitting unit 400 is not allowed in step S514 (step S514: No), the imaging apparatus 1a proceeds to step S516 described later.

Subsequently, when the driving of the flash emitting unit 400 is inhibited (step S516: Yes), the main body controller 225 disables the strobe mode and stops the operation of the strobe circuit (not illustrated) (step S517). Subsequently to step S517, the imaging apparatus 1a proceeds to step S518 described later.

When the driving of the flash emitting unit 400 is not inhibited in step S516 (step S516: No), the imaging apparatus 1a proceeds to step S518 described later.

Subsequently, when a zoom operation is performed via the lens operating unit 311 (step S518: Yes), the main body controller 225 drives the zoom drive unit 302 to drive the zoom optical system 301 along the optical axis O1 to change the focal distance (step S519). Subsequently to step S519, the imaging apparatus 1a proceeds to step S520 described later.

When the zoom operation is not performed via the lens operating unit 311 in step S518 (step S518: No), the imaging apparatus 1a proceeds to step S520 described later.

Subsequently, when the release switch 217b is operated and the 1st signal is input (step S520: Yes), the imaging apparatus 1a executes an AF process on a subject and performs a preparing operation for shooting to determine an exposure value (step S521).

Subsequently, when the 2nd signal is input from the release switch 217b (step S522: Yes), the display control unit 225h suspends displaying of the live-view image displayed by the rear display unit 216 or the eyepiece display unit 214 (step S523).

Subsequently, the imaging control unit 225g allows the image sensor 203 to execute a shooting operation (step S524). In this case, the imaging control unit 225g records the image data generated by the image sensor 203 in the recording medium 220. When a special effect is selected by the imaging apparatus 1a, the imaging control unit 225g records image data obtained by the special effect processing unit 228a applying a special effect to the image data in the recording medium 220.

After that, the display control unit 225h resumes displaying a live-view image so that live-view images corresponding to the image data successively generated by the image sensor 203 are sequentially displayed on the rear display unit 216 or the eyepiece display unit 214 (step S525). Subsequently to step S525, the imaging apparatus 1a returns to step S506 described above.

When the release switch 217b is not operated and the 1st signal is not input in step S520 (step S520: No), the imaging apparatus 1 proceeds to step S526.

Subsequently, when an OFF signal for turning the power of the imaging apparatus 1a off is input from the power switch 217a (step S526: Yes), the imaging apparatus 1a executes a system stop operation of stopping the system (step S527). Subsequently to step S527, the imaging apparatus 1a ends this process.

When the OFF signal for turning the power of the imaging apparatus 1a off is not input from the power switch 217a in step S526 (step S526: No), the imaging apparatus 1a returns to step S506 described above.

According to the second embodiment of the present invention described above, when the drive signal for driving the optical sighting unit 500 is input from the switch unit 213b, the imaging control unit 225g drives the zoom drive unit 302 to move the zoom optical system 301 to stop at a telephoto position. Thus, it is possible to perform telephoto shooting with a simple operation and to capture an image of a subject immediately.

According to the second embodiment of the present invention, when a stop signal for stopping the driving of the optical sighting unit 500 is input from the switch unit 213b, the imaging control unit 225g stops the driving of the zoom drive unit 302 to stop the zoom optical system 301 at the telephoto position. As a result, it is possible to perform telephoto shooting while seeing the live-view image displayed on the rear display unit 216 or on the eyepiece display unit 214 with a simple operation.

According to the second embodiment of the present invention, the input unit 217 receives a command signal for setting a focal distance corresponding to the telephoto position. Thus, the photographer can set a desired telephoto position with a simple operation.

According to the second embodiment of the present invention, when the optical sighting unit 500 is driven, the imaging control unit 225g inhibits emission of the illumination light of the flash emitting unit 400 and the assist light of the assist light emitting unit 226. Thus, it is possible to prevent emission of unnecessary illumination light or AF assist light during telephoto shooting.

According to the second embodiment of the present invention, the display control unit 225h causes the rear display unit 216 to display information that associates the position of the light source unit 501 detected by the displacement amount detection unit 706 with the focal distance of the zoom lens detected by the zoom position detection unit 303 such that the information is superimposed on the live-view image. As a result, the photographer can immediately understand the relation between the sighting position of the light beam or the sighting mark of the optical sighting unit 500 and the focal distance of the zoom optical system 301.

Figure 30:
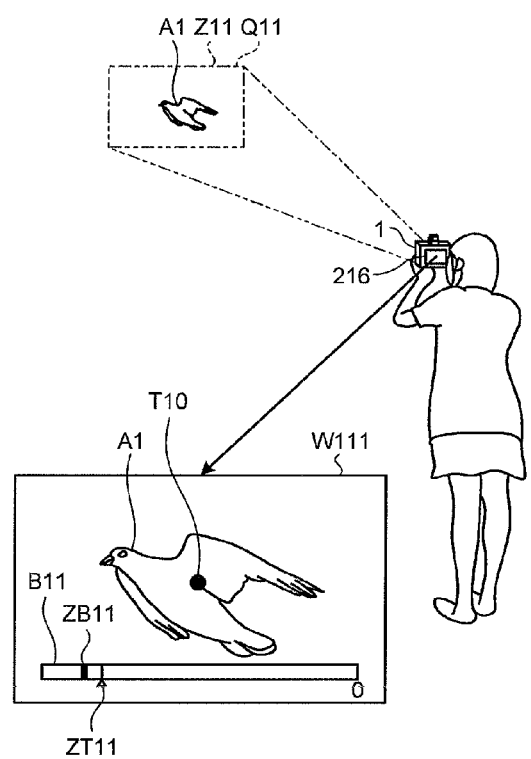
FIG. 30 is a diagram illustrating an example of an image displayed by the rear display unit of the imaging apparatus according to the second embodiment of the present invention.

In the second embodiment of the present invention, the display control unit 225h may cause the rear display unit 216 or the eyepiece display unit 214 to display information that associates the position of the light source unit 501 detected by the displacement amount detection unit 706 with the current focal distance of the zoom optical system 301 detected by the zoom position detection unit 303 such that the information is superimposed on the live-view image. Specifically, as illustrated in FIG. 30, the display control unit 225h displays information ZB11 indicating a current focal distance in a bar B11 indicating the focal distance of the lens unit 3 and information ZT11 indicating the sighting position of the optical sighting unit 500 on a live-view image W111 displayed by the rear display unit 216. In this way, the photographer can immediately understand the current focal distance and the sighting position of the optical sighting unit 500.

In the second embodiment of the present invention, the lens barrier mechanism 4 may be replaced with a lens barrel with a lens barrier (see Japanese Laid-open Patent Publication No. 2009-169178). The lens barrel includes a barrier member, a barrier driving member, and a moving frame. The barrier member advances and retracts in the direction of the optical axis O2 between a retracted position of the lens unit 3 and a shooting preparation position of the lens unit 3 and is provided at a distal end of the lens unit 3. When the barrier member is at the retracted position, the barrier member is driven to a closed position where the barrier member protects the front surface of the lens unit 3. When the barrier member is at the shooting preparation position, the barrier member is biased to an open position where the barrier member retracts from the front surface of the lens unit 3. The barrier driving member has a first arm portion formed so as to be extended in the direction of the optical axis O2 in order to drive the barrier member to the closed position and rotates about the optical axis O2. The moving frame has a second arm portion formed so as to be extended in the direction of the optical axis so that the moving frame moves in the direction of the optical axis O2 according to the advances and retracts of the barrier member between the retracted position of the lens unit 3 and the shooting preparation position of the lens unit 3, the second arm portion engages with the first arm portion during movement toward the retracted position to drive the barrier driving member so that the barrier member is positioned at the closed position, and the second arm portion is disengaged from the first arm portion during movement toward the shooting preparation position so that the barrier member is positioned at the open position.

In the second embodiment of the present invention, when the playback switch 217f illustrated in the drawing, for example, is pressed, switching from the shooting mode to the playback mode is conducted. In this case, the zoom optical system 301 of the lens unit 3 is a retracted state. In this case, when the optical sighting unit 500 is in a pop-up state and the light source unit 501 of the optical sighting unit 500 performs light emission, the sighting control unit 225f may turn off the light source unit 501 if the mode switches to the playback mode. The display control unit 225h may display the image data captured finally on the rear display unit 216. Moreover, the imaging apparatus 1a may enlarge or reduce the image corresponding to the image data displayed on the rear display unit 216 according to the operation of the lens operating unit 311 and may allow the playback image to be edited by a trimming process or displaying composition guides in a superimposed manner as necessary. When the playback switch 217f is pressed, the mode returns to the shooting mode from the playback mode. The image displayed on the rear display unit 216 is switched from the playback image to the live-view image. Further, when the optical sighting unit 500 is in a pop-up state, a light beam or a sighting mark is emitted from the light source unit 501 of the optical sighting unit 500. Typically, when the ON state of the switch unit 213b for pop-up or the half-pressed state of the release switch 217b is confirmed and the operation is started, the light beam or the sighting mark is emitted from the light source unit 501 of the optical sighting unit 500. When the lens operating unit 311 is operated, the imaging apparatus 1a is gradually positioned between the wide end and the telephoto end and a live-view image is displayed on the rear display unit 216. Moreover, in the shooting mode, the imaging apparatus 1a may stop emission of the light beam or the sighting mark from the light source unit 501 of the optical sighting unit 500. In this case, activation of the pop-up switch is invalidated. By stopping emission of light from the light source unit 501 of the optical sighting unit 500 in the playback mode and the panorama shooting mode, it is possible to reduce power consumption of the battery.

Other Embodiments

In some embodiments, when the optical sighting unit 500 is driven, as illustrated in FIG. 21, the imaging control unit 225g may drive the lens-shake correction unit 310 via the lens control unit 314 to move the positions of the zoom optical system 301 and the focus optical system 307 so that the parallax between the optical sighting unit 500 and the lens unit 3 decreases automatically.

In some embodiments, the display control unit 225h may adjust the brightness or the size of the light beam or the sighting mark emitted by the light source unit 501 of the optical sighting unit 500 based on the brightness of the field of view area. In this way, it is possible to set sights on the subject with brightness optimal to the environment of the imaging apparatus 1.

In some embodiments, the display control unit 225h may change the color, shape, or the like of a frame corresponding to an angle of view according to the type of a subject (for example, a face or an animal) and use the frame as the light beam or the sighting mark emitted from the light source unit 501 of the optical sighting unit 500.

In some embodiments, although a half mirror is used as the optical element 502, the optical element 502 may be configured by combining a light-guiding plate formed of a holographic device having a dielectric multilayer film formed thereon, a prism, and the like.

In some embodiments, when the imaging control unit 225g drives the optical sighting unit 500, the imaging control unit 225g performs imaging control that changes the driving control of the image stabilization unit 205 and/or the driving control of the point of focus of the lens unit 3 as the imaging control corresponding to the driving of the optical sighting unit 500. The shooting parameter of the imaging apparatus 1 may be changed. Specifically, when the optical sighting unit 500 is driven, the imaging control unit 225g may perform shooting under the control in which the shooting parameters (for example, an aperture, an exposure value, a shutter speed, an ISO sensitivity, a gradation, a white balance, and a chroma) are changed. For example, when the optical sighting unit 500 is driven, the imaging control unit 225g may perform shooting under the control in which shooting parameters are changed such that the aperture and the ISO sensitivity are increased and the shutter speed is increased. By doing so, when imaging a subject such as a bird in a telephoto mode, it is possible to perform the imaging while bringing the subject and a surrounding scene into focus.

The imaging apparatus according to some embodiments can be applied to, for example, a lens-integrated digital camera, a lens-integrated digital video camera, and an electronic device such as a mobile phone with an imaging function and a tablet type portable device with an imaging function, in addition to a digital single lens reflex camera to which a lens is detachably attached.

Moreover, the imaging apparatus according to some embodiments can be applied to an accessory in which an optical sighting unit is detachably attached to a main body portion via a hot shoe or the like as well as a digital camera in which an optical sighting unit and a main body portion are integrally formed.

A program executed by the imaging apparatus according to some embodiments is recorded in a computer-readable recording medium such as a CD-ROM, a flexible disk (FD), a CD-R, a Digital Versatile Disk (DVD), a USB medium, and a Flash memory as file data in an installable format or an executable format and provided.

The program executed by the imaging apparatus according to some embodiments may be recorded in the Flash memory, the recording medium, or the like by downloading the program through the network. Further, the program executed by the imaging apparatus according to some embodiments may be provided or distributed through a network such as the Internet.

In the description of the flowcharts in the description, the context of the processing of steps is clearly specified by using terms such as "first," "thereafter," and "subsequently." However, the sequence of the processing necessary to implement the present invention is not uniquely determined by these terms. In other words, the sequence of processing in the flowcharts described in the present description can be changed as long as no conflict occurs.

As described above, the present invention may include various embodiments not described here, and various design changes can be made within the scope of the technical ideas specified by the claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging optical system provided on a front side of the imaging apparatus facing a subject and configured to collect light from a field of view area;
    an image sensor configured to receive the light collected from the field of view area via the imaging optical system to generate image data;
    an optical sighting unit configured to transmit the light from the field of view area collected by the imaging optical system and to produce a virtual image of a light beam or a sighting mark in an area where the light from the field of view area transmits, the optical sighting unit comprising:
        a light source configured to emit the light beam or the sighting mark; and
        an optical element configured to transmit the light from the field of view area and to reflect a light flux emitted by the light source toward a rear side opposite to the front side;
    a controller comprising an imaging control unit configured to perform imaging under imaging control corresponding to driving of the optical sighting unit when the optical sighting unit is driven;
    a leg portion that holds at least the optical element so as to be movable in a direction away from the imaging apparatus and holds the light source so as to be movable on a vertical plane orthogonal to the optical axis of the imaging optical system;
    a flash provided at a distal end of the leg portion and configured to emit illumination light to the field of view area; and
    an assist light configured to emit assist light to the field of view area during an auto-focus process for automatically focusing the imaging apparatus, wherein
    when the optical sighting unit is driven, the imaging control unit is configured to inhibit the flash from emitting the illumination light and the assist light from emitting the assist light.

2. The imaging apparatus according to claim 1, wherein the controller further comprises a switch unit configured to receive a drive signal for driving the optical sighting unit, wherein
    the imaging optical system comprises:
        a zoom lens configured to change a focal distance; and
        a zoom motor configured to move the zoom lens along an optical axis of the imaging optical system, wherein
    when the drive signal is input from the switch unit, the imaging control unit is configured to drive the zoom motor to move the zoom lens to stop at a telephoto position.

3. The imaging apparatus according to claim 2, wherein the switch unit is configured to further receive a stop signal for stopping the driving of the optical sighting unit, and
    when the stop signal is input from the switch unit, the imaging control unit is configured to stop the zoom lens at the telephoto position.

4. The imaging apparatus according to claim 3, further comprising an input control configured to receive a command signal for setting a focal distance corresponding to the telephoto position.

5. The imaging apparatus according to claim 1, further comprising a light source adjuster configured to adjust a position of the light source in the leg portion.

6. The imaging apparatus according to claim 5, further comprising:
    a position detector configured to detect the position of the light source in the leg portion;
    a display configured to display an image corresponding to the image data;
    a focal distance detector configured to detect a current focal distance of the imaging optical system; and
    a controller comprising a display control unit configured to cause the display to display information that associates the position of the light source detected by the position detector with the focal distance detected by the focal distance detector such that the information is superimposed on the image.

7. The imaging apparatus according to claim 1, further comprising a motor configured to move the imaging optical system along an optical axis of the imaging optical system, wherein
    the imaging control unit is configured to move the imaging optical system to adjust a point of focus of the imaging optical system by driving the motor and to set the point of focus in a specified area within an image corresponding to the image data when the optical sighting unit is driven.

8. The imaging apparatus according to claim 7, further comprising an input control configured to receive a command signal for indicating a position within the image, wherein
    the specified area is a central area of the image or an area that includes the position according to the command signal received by the input control.

9. An imaging apparatus comprising:
    an imaging optical system provided on a front side of the imaging apparatus facing a subject and configured to collect light from a field of view area;

an image sensor configured to receive the light collected from the field of view area via the imaging optical system to generate image data;

an optical sighting unit comprising a light source and an optical element configured to transmit the light from the field of view area collected by the imaging optical system and to produce a virtual image of a light beam or a sighting mark in an area where the light from the field of view area transmits;

a controller comprising an imaging control unit configured to perform imaging under imaging control corresponding to driving of the optical sighting unit when the optical sighting unit is driven;

a blurring detector configured to detect blurring occurring in the imaging apparatus; and an image stabilizer configured to move one of the image sensor and the imaging optical system to suppress the blurring, wherein the imaging control unit is configured to control driving of the image stabilizer based on a detection result of the blurring detected by the blurring detector and to hold the driving of the image stabilizer when the optical sighting unit is driven.

10. The imaging apparatus according to claim 9, further comprising a release switch configured to receive a start signal for starting exposure, wherein when the optical sighting unit is driven and the start signal is input from the release switch, the imaging control unit is configured to drive the image stabilizer.

11. The imaging apparatus according to claim 10, wherein the controller further comprises a distance detection unit configured to detect a distance to the imaging apparatus from the subject within an angle of view corresponding to the image data, wherein when the optical sighting unit is driven, the imaging control unit is configured to drive the image stabilizer to move the image sensor based on the distance detected by the distance detection unit.

12. The imaging apparatus according to claim 10, wherein the controller further comprises a face detection unit configured to detect a face of the subject in an image corresponding to the image data, wherein when the optical sighting unit is driven, the imaging control unit is configured to drive the image stabilizer to move the image sensor such that an area including the face detected by the face detection unit is positioned at a center of the image.

13. The imaging apparatus according to claim 10, further comprising an input control configured to receive a command signal for moving the position of the image sensor, wherein when the optical sighting unit is driven and the input control receives the command signal, the imaging control unit is configured to drive the image stabilizer to move the image sensor to a position corresponding to the command signal.

14. The imaging apparatus according to claim 10, wherein the controller further comprises a subject detection unit configured to detect the subject that moves between images corresponding to the image data generated continuously in time by the image sensor, wherein the blurring detector is configured to detect, as the blurring, repositioning of the imaging apparatus, and when the blurring detector detects the repositioning, the imaging control unit is configured to move the image sensor according to the subject detected by the subject detection unit and to perform the imaging under imaging control for suppressing the blurring.

15. The imaging apparatus according to claim 9, wherein the optical sighting unit comprises:

a light source configured to emit the light beam or the sighting mark; and an optical element configured to transmit the light from the field of view area and to reflect the light beam or the sighting mark emitted by the light source toward a rear side opposite to the front side.

16. The imaging apparatus according to claim 15, further comprising a leg portion that holds at least the optical element so as to be movable in a direction away from the imaging apparatus.

17. The imaging apparatus according to claim 16, wherein the leg portion has a base end that is rotatably supported on the imaging apparatus, the light source is provided in the imaging apparatus or the leg portion, and the optical sighting unit has a support portion that rotatably supports the optical element with respect to the imaging apparatus.

18. An imaging apparatus comprising:

an imaging optical system provided on a front side of the imaging apparatus facing a subject and configured to collect light from a field of view area;

an image sensor configured to receive the light collected from the field of view area via the imaging optical system to generate image data;

an optical sighting unit comprising a light source and an optical element configured to transmit the light from the field of view area collected by the imaging optical system and to produce a virtual image of a light beam or a sighting mark in an area where the light from the field of view area transmits;

a controller comprising an imaging control unit configured to perform imaging under imaging control corresponding to driving of the optical sighting unit when the optical sighting unit is driven;

a motor configured to move the imaging optical system along an optical axis of the imaging optical system;

a rear display configured to display the image corresponding to the image data;

an eyepiece display configured to display the image corresponding to the image data;

an object detector configured to detect an object near the eyepiece display; and a controller comprising a display control unit configured to cause the eyepiece display to display the image when the object detector detects the object and to cause the rear display to display the image when the object detector does not detect the object, wherein the imaging control unit is configured to move the imaging optical system to adjust a point of focus of the imaging optical system by driving the motor and to set the point of focus in a specified area within an image corresponding to the image data when the optical sighting unit is driven, and when the object detector detects the object during driving of the optical sighting unit, the imaging control unit is configured to stop the driving of the optical sighting unit.

* * * * *